US012382305B2

(12) United States Patent
Pulido Mancera et al.

(10) Patent No.: US 12,382,305 B2
(45) Date of Patent: *Aug. 5, 2025

(54) COMPUTATIONAL SENSING FOR TELECOMMUNICATION TARGET LOCALIZATION

(71) Applicant: Pivotal Commware, Inc., Bothell, WA (US)

(72) Inventors: Laura Maria Pulido Mancera, Bellevue, WA (US); Eric James Black, Bothell, WA (US)

(73) Assignee: Pivotal Commware, Inc., Bothell, WA (US)

( * ) Notice: Subject to any disclaimer, the term of this patent is extended or adjusted under 35 U.S.C. 154(b) by 52 days.

This patent is subject to a terminal disclaimer.

(21) Appl. No.: 18/456,704

(22) Filed: Aug. 28, 2023

(65) Prior Publication Data

US 2024/0137776 A1 Apr. 25, 2024
US 2024/0236696 A9 Jul. 11, 2024

Related U.S. Application Data

(63) Continuation of application No. 18/047,992, filed on Oct. 19, 2022, now Pat. No. 11,743,741.

(51) Int. Cl.
*H04W 16/18* (2009.01)
*H04B 7/06* (2006.01)
*H04W 84/04* (2009.01)

(52) U.S. Cl.
CPC .......... *H04W 16/18* (2013.01); *H04B 7/0617* (2013.01); *H04W 84/047* (2013.01)

(58) Field of Classification Search
CPC ..... H04W 16/18; H04W 16/26; H04W 16/28; H04W 84/047; H04B 7/0434; H04B 7/0617; H04B 7/086; H04B 7/15528
See application file for complete search history.

(56) References Cited

U.S. PATENT DOCUMENTS 11,069,975 B1  7/2021  Mason
11,743,741 B1*  8/2023  Pulido Mancera ... H04W 16/26
455/456.1

(Continued)

OTHER PUBLICATIONS

Mancera, et al., "Application of range migration algorithms to imaging with a dynamic metasurface antenna," Journal of the Optical Society of America B, Oct. 2016, vol. 33, No. 10, USA, pp. 2082-2092.

(Continued)

*Primary Examiner* — Siu M Lee
(74) *Attorney, Agent, or Firm* — PCFB, LLC; Justin K. Flanagan

(57) ABSTRACT

A device may include an antenna subsystem to support image sensing and wireless network communications. A device may include a localization subsystem to determine a location of a wireless base station within a defined region via computational imaging of the region using an image-sensing antenna of the antenna subsystem operating at a sensing frequency within the operational frequency band of the wireless base station. A device may include a communication subsystem to adjust a steering angle of a communication antenna based on the location of the wireless base station as determined by the localization subsystem.

26 Claims, 18 Drawing Sheets

(56) References Cited

U.S. PATENT DOCUMENTS

| | | | |
|---|---|---|---|
| 2014/0266896 A1* | 9/2014 | Hyslop | H04B 7/18506 342/368 |
| 2016/0373181 A1 | 12/2016 | Black | |
| 2021/0159945 A1 | 5/2021 | Deutsch | |
| 2021/0341561 A1* | 11/2021 | Huang | G01S 5/0018 |

OTHER PUBLICATIONS

Imani, et al., "Review of metasurface antennas for computational microwave imaging," IEEE Transactions of Antennas and Propagation, 2020, https://doi.org/10.1109/TAP.2020.2968795, 16 pp.

U.S. Appl. No. 18/047,992, Ex Parte Quayle Action Mailed Feb. 10, 2023, 9 pp.

* cited by examiner

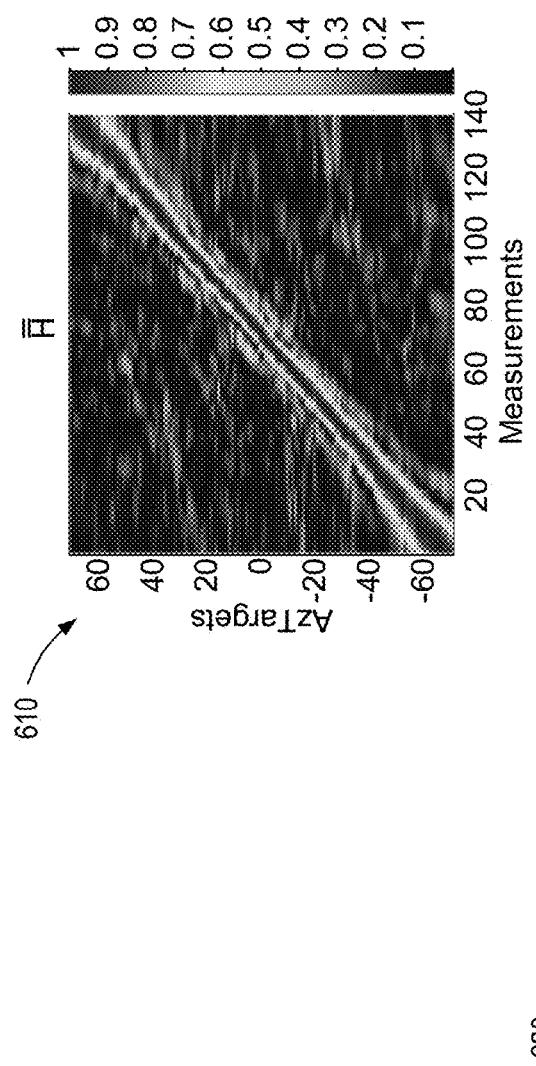
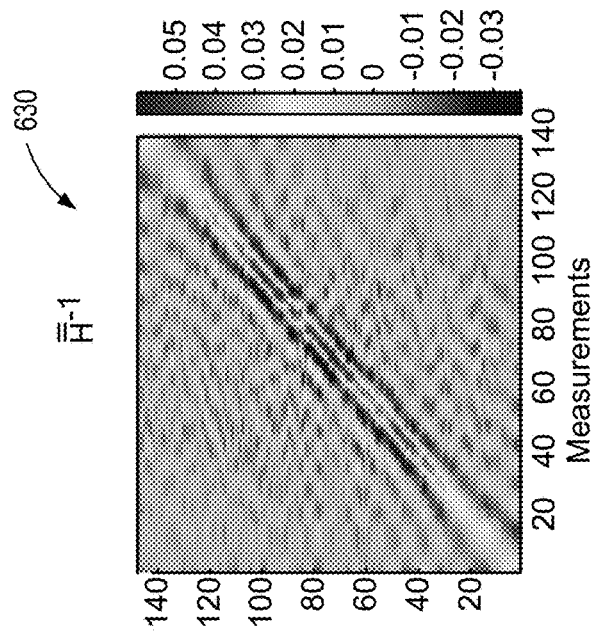
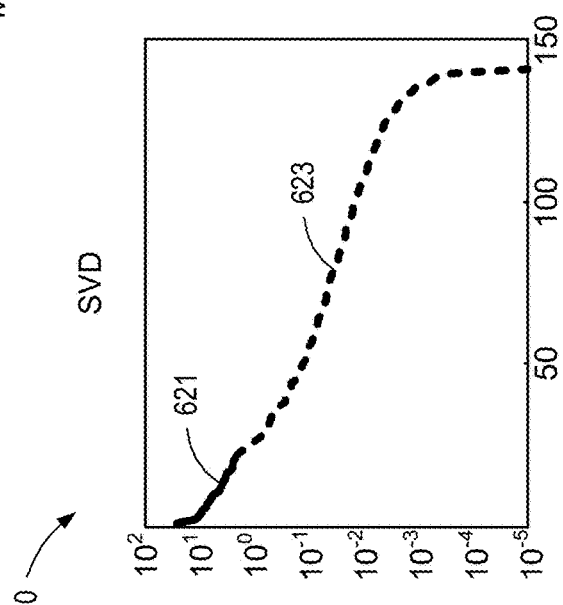
FIG. 6A
FIG. 6B
FIG. 6C

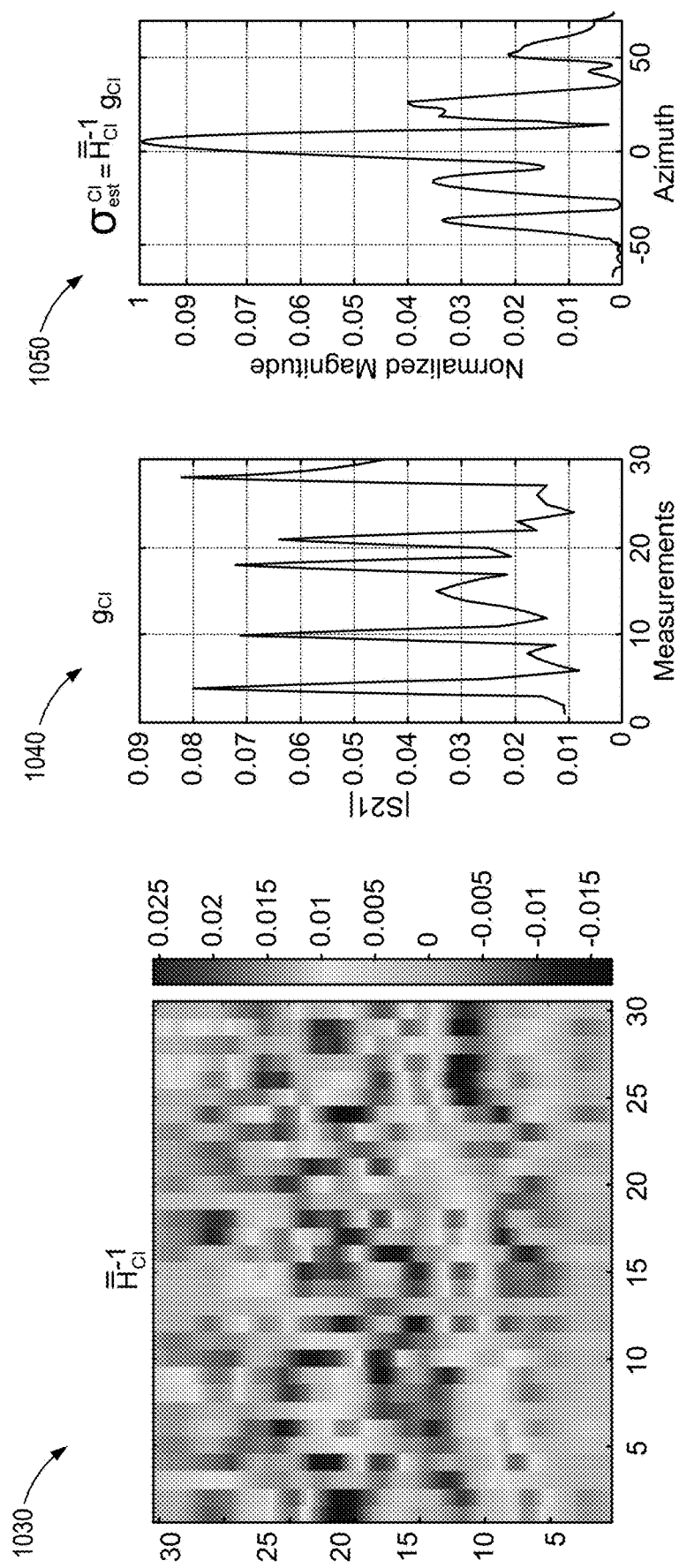

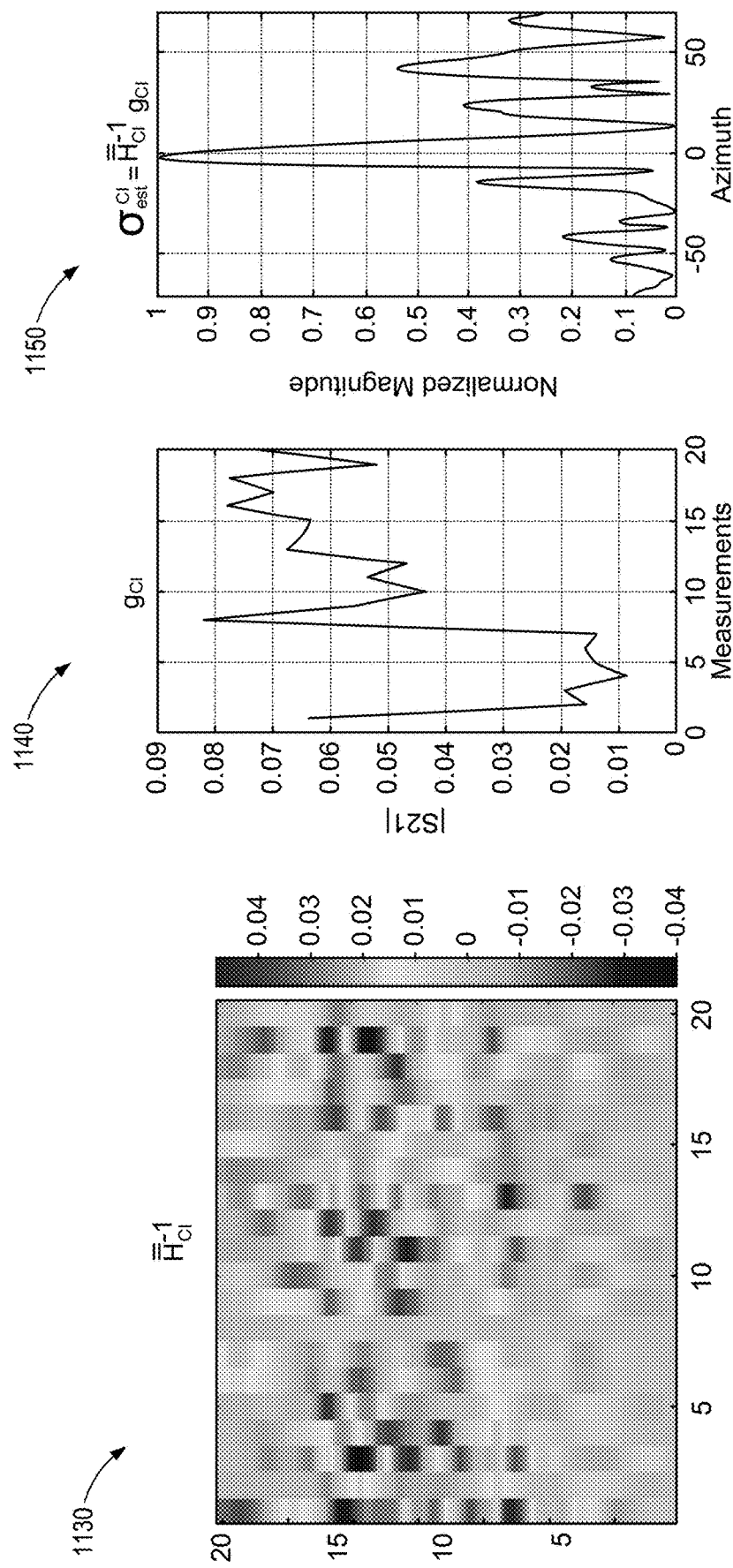

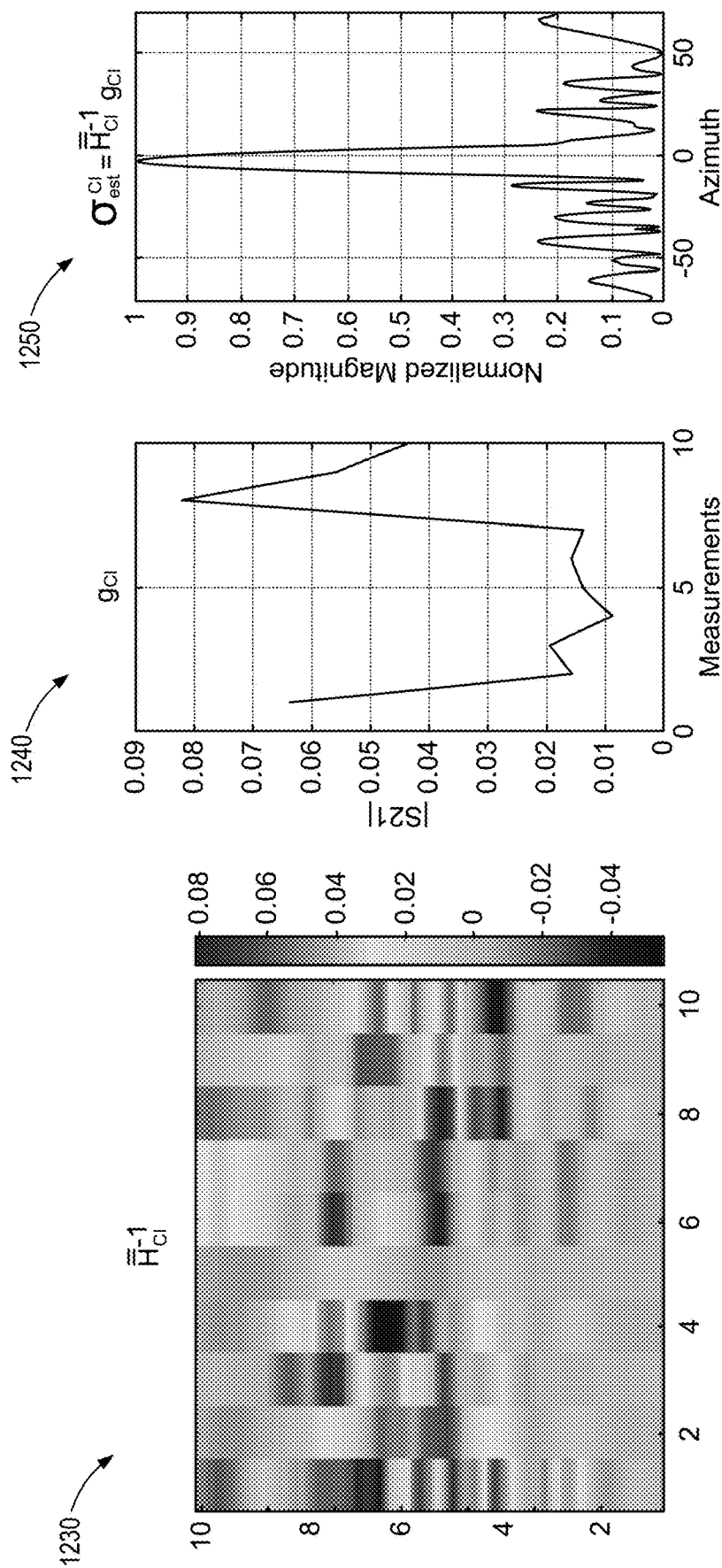

| Scan Type and Number of Measurements | Indices on H Matrix | Time (Normalized) |
|---|---|---|
| Raster Scan with 141 Measurements (FIG. 7A) | 1:141 | 100 |
| Computational Imaging with 70 Measurements (FIG. 9A) | 1:71 | 50.3 |
| Computational Imaging with 30 Measurements (FIG. 10A) | 20:50 | 22.1 |
| Computational Imaging with 20 Measurements (FIG. 11A) | 25:45 | 15.0 |
| Computational Imaging with 10 Measurements (FIG. 12A) | 0:10 | 7.2 |

FIG. 13

COMPUTATIONAL SENSING FOR TELECOMMUNICATION TARGET LOCALIZATION

RELATED APPLICATIONS

This application is a continuation of U.S. Non-Provisional patent application Ser. No. 18/047,992, titled "Computational Sensing For Telecommunication Target Localization," filed on Oct. 19, 2022 and issuing on Aug. 29, 2023 as U.S. Pat. No. 11,743,741, which is hereby incorporated by reference in its entirety.

TECHNICAL FIELD

This disclosure relates to computational imaging, including compressive imaging. This disclosure also relates to telecommunication antennas, base station target localization, antenna positioning, and holographic beamforming.

BRIEF DESCRIPTION OF THE DRAWINGS

FIG. 6A illustrates an example sensing matrix of measurement values from a raster scan, according to one embodiment.

FIG. 6B illustrates a graphical representation of truncation of the singular value decomposition of the raster scan sensing matrix, according to one embodiment.

FIG. 6C illustrates the inverse of the raster scan sensing matrix after singular value decomposition truncation, according to one embodiment.

FIG. 10A illustrates a pseudo-inverse of a computational imaging scan sensing matrix with 30 measurements, according to one embodiment.

FIG. 10B illustrates a detection vector of the measurements obtained during the computational imaging scan with 30 measurements, according to one embodiment.

FIG. 10C illustrates a scene vector calculated as the product of the pseudo-inverse of the computational imaging scan sensing matrix and the detection vector of FIGS. 10A and 10B, according to one embodiment.

FIG. 11A illustrates a pseudo-inverse of a computational imaging scan sensing matrix with 20 measurements, according to one embodiment.

FIG. 11B illustrates a detection vector of the measurements obtained during the computational imaging scan with 20 measurements, according to one embodiment.

FIG. 11C illustrates a scene vector calculated as the product of the pseudo-inverse of the computational imaging scan sensing matrix and the detection vector of FIGS. 11A and 11B, according to one embodiment.

FIG. 12A illustrates a pseudo-inverse of a computational imaging scan sensing matrix with 10 measurements, according to one embodiment.

FIG. 12B illustrates a detection vector of the measurements obtained during the computational imaging scan with 10 measurements, according to one embodiment.

FIG. 12C illustrates a scene vector calculated as the product of the pseudo-inverse of the computational imaging scan sensing matrix and the detection vector of FIGS. 12A and 12B, according to one embodiment.

FIG. 13 illustrates a table comparing the number of measurements in each type of scan, the number of indices in the associated sensing matrix, and the computational time, according to one embodiment.

DETAILED DESCRIPTION

Figure 1A:
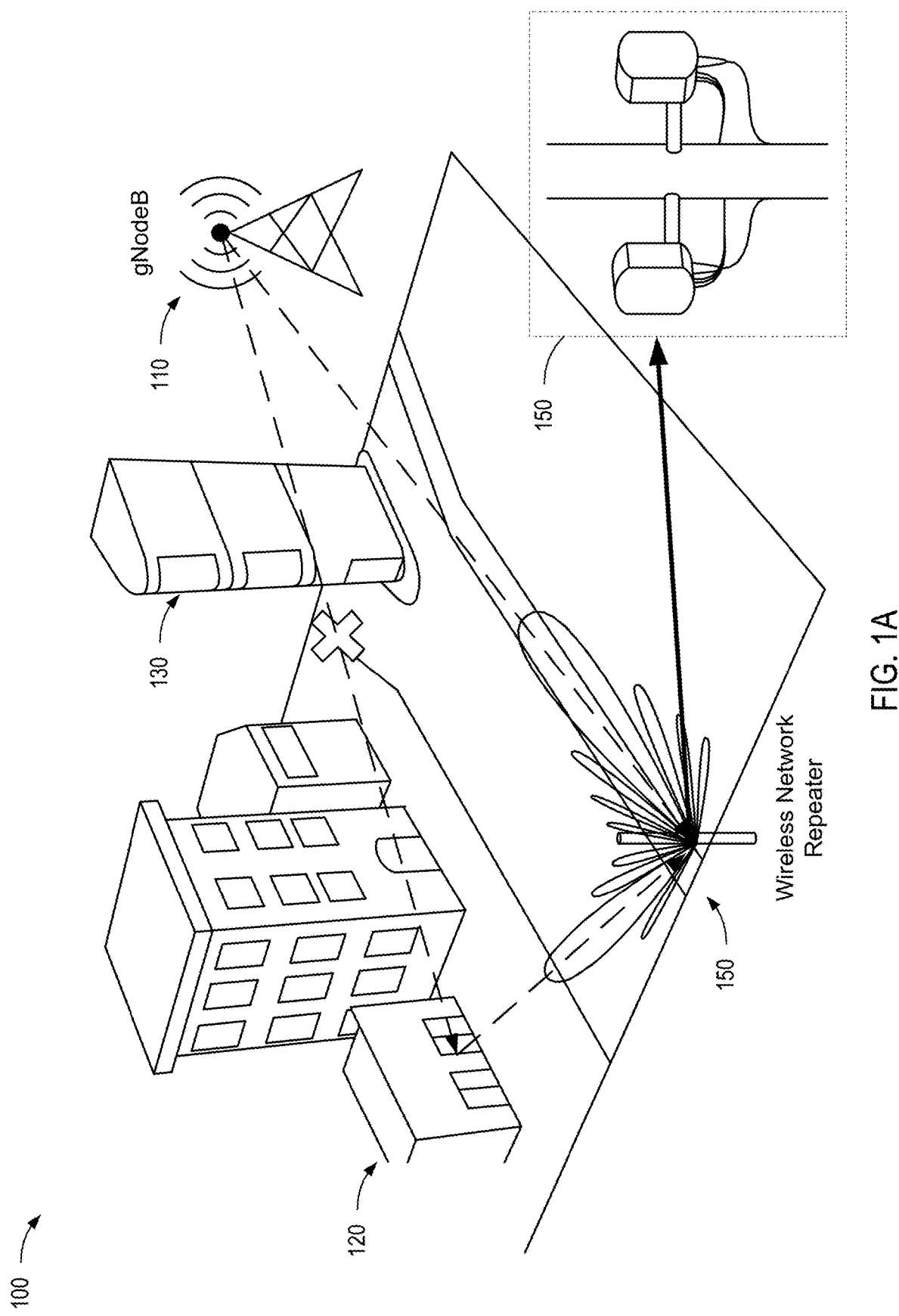
FIG. 1A is an example illustration of a wireless network repeater in communication with a gNodeB of a fifth-generation wireless network, according to one embodiment.

Examples of the presently described systems and methods encompass wireless network repeaters, beamforming millimeter wave signals for communication, methods for telecommunication target localization, and various combination of hardware, firmware, and/or software to control beamforming and target localization in a telecommunications network.

In one embodiment, a wireless network repeater includes an antenna subsystem that supports both image sensing and wireless network communications. The wireless network repeater may, for example, be part of a fifth-generation cellular network (commonly referred to as a "5G network"), such as millimeter-wave 5G networks or high-band 5G networks operating at frequencies between approximately 24 GHz and 47 GHz, or higher. In such embodiments, the antenna subsystem may, for example, include a first millimeter-wave holographic beamforming antenna for image sensing and a second millimeter-wave holographic beamforming antenna for network communications. In other embodiments, the antenna subsystem may have a single, millimeter-wave holographic beamforming antenna used for both image sensing and communication.

A wireless network repeater may utilize a holographic beamforming antenna that allows for beamsteering imaging with, for example, a single static antenna array or "HBF antenna" to create highly directive beams in different azimuth and/or elevation directions. The systems described herein utilize a holographic beamforming antenna to avoid the complexity, bulkiness, cost, and inefficiencies associated with mechanically-moved antennas and synthetic aperture radar (SAR) arrays.

The wireless network repeater includes a localization subsystem configured to determine a location of a wireless base station, such as a millimeter-wave gNodeB base station. As described herein, the localization subsystem may determine a location of the wireless base station within a defined region using computational imaging. The localization subsystem uses an image-sensing antenna to image the region. In various embodiments, the image-sensing antenna operates at the same frequency or within the same frequency band as the wireless base station.

The wireless network repeater further includes a communication subsystem to adjust a steering angle of the communication antenna based on the location of the wireless base station as determined by the localization subsystem. Again, in some implementations, a different physical antenna is used for image sensing and communication. In other embodiments, the same physical antenna may be used for both image sensing and communication.

The localization subsystem determines the location of the wireless base station so that the communication antenna can be steered toward the wireless base station. Precise steering of the communication antenna allows the wireless network repeater to operate at higher bandwidth and/or lower power levels. According to various embodiments, the imaging antenna of the localization subsystem is a holographic beamforming antenna. In such embodiments, the localization subsystem determines the location of the wireless base station using computational imaging by generating a sequence of holographic states using a holographic beamforming antenna, where each holographic state of the sequence of holographic states corresponds to at least two orthogonal beamforms steered to discrete azimuth and elevation angle pairs within the region (e.g., volume) known or defined to contain the wireless base station (the "region"). In some embodiments, each holographic state of the sequence of holographic states corresponds to at least three orthogonal beamforms steered to different angle pairs within a region of interest.

The localization subsystem may generate a sensing matrix $\overline{H}$ of beamform transmission values. Each row of the sensing matrix $\overline{H}$ represents one of the holographic states and each column of the sensing matrix $\overline{H}$ represents one of the angle pairs in the region. The localization subsystem also generates a detection column vector $\overline{g}$ of measured signal strengths of signals received from the wireless base station in each holographic state.

The localization subsystem calculates a pseudo-inverse of the sensing matrix $\overline{H}^{-1}$ and estimates a scene row vector $\overline{\sigma}$ as the product of the pseudo-inverse of the sensing matrix $\overline{H}^{-1}$ and the detection column vector $\overline{g}$. Each element of the scene row vector $\overline{\sigma}$ corresponds to an angle pair within the region. The localization subsystem identifies the location of the wireless base station at the angle pair corresponding to the element having the highest value in the scene row vector $\overline{\sigma}$. Additional examples and illustrations are provided herein.

In some embodiments, the localization subsystem is configured to calculate the pseudo-inverse of the sensing matrix $\overline{H}^{-1}$ by first implementing a singular value decomposition factorization of the sensing matrix $\overline{H}$ to determine the singular values of the sensing matrix $\overline{H}$. The localization subsystem may then truncate the singular values that are less than a tolerance percentage of a maximum magnitude of a singular value of the sensing matrix $\overline{H}$. The pseudo-inverse of the sensing matrix ($\overline{H}^{-1}$ is then calculated using the truncated singular values. In some embodiments, a "tolerance percentage" may be established to determine which of the singular values to truncate. For example, a tolerance percentage of one percent may be utilized, such that the singular values that are less than one percent of the singular value with the maximum magnitude in the sensing matrix $\overline{H}$ are truncated.

Various hardware components and their functions and configurations are described above as part of a wireless network repeater. It is appreciated that a wireless network repeater with alternative hardware, firmware, and/or software component configurations or combinations may be utilized to implement the presently described target localization and beamforming communication approaches. In various embodiments, a wireless network repeater may identify a region of interest within which to search for a telecommunication device (e.g., a gNodeB or "gNB" of a 5G network). The region of interest is, for example, definable in terms of discrete azimuth and elevation angle pairs. The number of angle pairs corresponds to a beamwidth of steerable beamforms generated by a holographic beamforming antenna.

The wireless network repeater generates a sequence of holographic states that correspond to at least two orthogonal beamforms steered to different angle pairs within the region of interest. For example, the wireless network repeater may generate orthogonal beams with beam superpositions selected through an optimization technique to reduce or even eliminate redundant or duplicative sensing of locations within the region. For instance, the wireless network repeater may use JOpt optimization techniques to identify a set of orthogonal beam superpositions for computational image sensing using left and right sub-apertures of a holographic beamforming antenna. JOpt optimization techniques may be used to select tuning parameters for the tunable radiating elements on the left sub-aperture (antenna elements to the left of the center feed) and the tunable radiating elements on the right sub-aperture (antenna elements to the right of the center feed). The JOpt-optimized tuning parameters are implemented (referred to as holograms or holographic values) to cause the left and right sub-apertures to generate highly directive beams for different azimuth values. As such, each implemented hologram generates two highly directive beams, including one beam from the left sub-aperture at a negative azimuth angle and one beam from the right sub-aperture at a positive azimuth angle.

As described herein, the system creates orthogonal beams as a single measurement that includes two beams that are different from one another. The term "orthogonal beams" is used to describe a pair of beams that illuminate two different portions of the region of interest and that are not transformations of each other. That is, the orthogonal beams are not rotations, translations, or mirrors of each other. The superposition of the two beams includes a steering beam on one side of the aperture (e.g., the left side of the aperture) together with a random pointing angle on the other side of the aperture (e.g., the right side of the aperture).

The wireless network repeater generates a sensing matrix $\overline{\overline{H}}$ of beamform transmission values in which each row represents one of the holographic states and each column represents one of the angle pairs in the region of interest. The wireless network repeater generates a detection column vector $\overline{g}$ of measured signal strengths of signals received from the telecommunication device in each holographic state and calculates a pseudo-inverse of the sensing matrix $\overline{\overline{H}}^{-1}$.

The wireless network repeater estimates a scene row vector $\overline{\sigma}$ as the product of the pseudo-inverse of the sensing matrix $\overline{\overline{H}}^{-1}$ and the detection column vector $\overline{g}$ that corresponds to an angle pair within the region of interest. The wireless network repeater identifies the telecommunication device as being located at the angle pair corresponding to the element having the highest value in the scene row vector $\overline{\sigma}$.

As described above, the wireless network repeater may calculate the pseudo-inverse of the sensing matrix $\overline{\overline{H}}^{-1}$ by first determining the singular values of the sensing matrix $\overline{\overline{H}}$ using a singular value decomposition factorization of the sensing matrix ($\overline{\overline{H}}$). The singular values that are less than a tolerance percentage of a maximum magnitude of a singular value of the sensing matrix $\overline{\overline{H}}$) are truncated and the pseudo-inverse of the sensing matrix $\overline{\overline{H}}^{-1}$ is calculated using the truncated singular values.

The beamform transmission values of the sensing matrix $\overline{\overline{H}}$ may be measured transmission values or calculated transmission values. The wireless network repeater may send the angle pair location of the telecommunication device to an antenna controller of a second telecommunication device. That is, a wireless network repeater may determine the location of the wireless base station and send the determined location to another device (e.g., another wireless network repeater). In other embodiments, a first device may determine the location of the wireless base station and provide that location to a wireless network repeater. The location information is used by the receiving device to steer a beamform toward the wireless base station.

Some of the infrastructure that can be used with embodiments disclosed herein is already available, such as general-purpose computers, computer programming tools and techniques, digital storage media, and communication links. Many of the systems, subsystems, modules, components, and the like that are described herein may be implemented as hardware, firmware, and/or software. Various systems, subsystems, modules, and components are described in terms of the function(s) they perform because such a wide variety of possible implementations exist. For example, it is appreciated that many existing programming languages, hardware devices, frequency bands, circuits, software platforms, networking infrastructures, and/or data stores may be utilized alone or in combination to implement a specific control function.

It is also appreciated that two or more of the elements, devices, systems, subsystems, components, modules, etc. that are described herein may be combined as a single element, device, system, subsystem, module, or component. Moreover, many of the elements, devices, systems, subsystems, components, and modules may be duplicated or further divided into discrete elements, devices, systems, subsystems, components or modules to perform subtasks of those described herein. Any of the embodiments described herein may be combined with any combination of other embodiments described herein. The various permutations and combinations of embodiments are contemplated to the extent that they do not contradict one another.

As used herein, a computing device, system, subsystem, module, or controller may include a processor, such as a microprocessor, a microcontroller, logic circuitry, or the like. A processor may include one or more special-purpose processing devices, such as an application-specific integrated circuit (ASIC), a programmable array logic (PAL), a programmable logic array (PLA), a programmable logic device (PLD), a field-programmable gate array (FPGA), and/or another customizable and/or programmable device. The computing device may also include a machine-readable storage device, such as non-volatile memory, static RAM, dynamic RAM, ROM, CD-ROM, disk, tape, magnetic, optical, flash memory, and/or another machine-readable storage medium. Various aspects of certain embodiments may be implemented or enhanced using hardware, software, firmware, or a combination thereof.

The components of some of the disclosed embodiments are described and illustrated in the figures herein. Many portions thereof could be arranged and designed in a wide variety of different configurations. Furthermore, the features, structures, and operations associated with one embodiment may be applied to or combined with the features, structures, or operations described in conjunction with another embodiment. In many instances, well-known structures, materials, or operations are not shown or described in detail to avoid obscuring aspects of this disclosure. The right to add any described embodiment or feature to any one of the figures and/or as a new figure is explicitly reserved.

The embodiments of the systems and methods provided within this disclosure are not intended to limit the scope of the disclosure but are merely representative of possible embodiments. In addition, the steps of a method do not necessarily need to be executed in any specific order, or even sequentially, nor do the steps need to be executed only once. As previously noted, descriptions and variations described in terms of transmitters are equally applicable to receivers, and vice versa.

FIG. 1A is an example illustration of an environment 100 that includes a wireless network repeater 150 in communication with a gNodeB 110 of a fifth-generation (5G) telecommunications network, according to one embodiment. A zoomed-in view of the wireless network repeater 150 shows an example implementation in which multiple wireless network repeaters 150 are positioned on a utility pole. The environment 100 includes a distant building 120 that is unable to receive a signal directly from the gNodeB 110 due to an obstruction 130 (a tall building). The obstruction 130 blocks a line of sight between the gNodeB 110 and the distant building 120. Higher frequencies, such as those used in 5G wireless communications systems, do not go through objects as well as the lower frequencies used by legacy communication systems.

As described herein, the wireless network repeater 150 may utilize holographic beamforming antennas to identify the relative location of the gNodeB 110 to facilitate the use of highly directive beams for subsequent communication between the gNodeB 110 and the wireless network repeater 150. The wireless network repeater 150 may utilize computational imaging (sometimes referred to herein as "CI") to accelerate the target localization (e.g., identifying the relative location of the gNodeB 110).

Figure 1B:
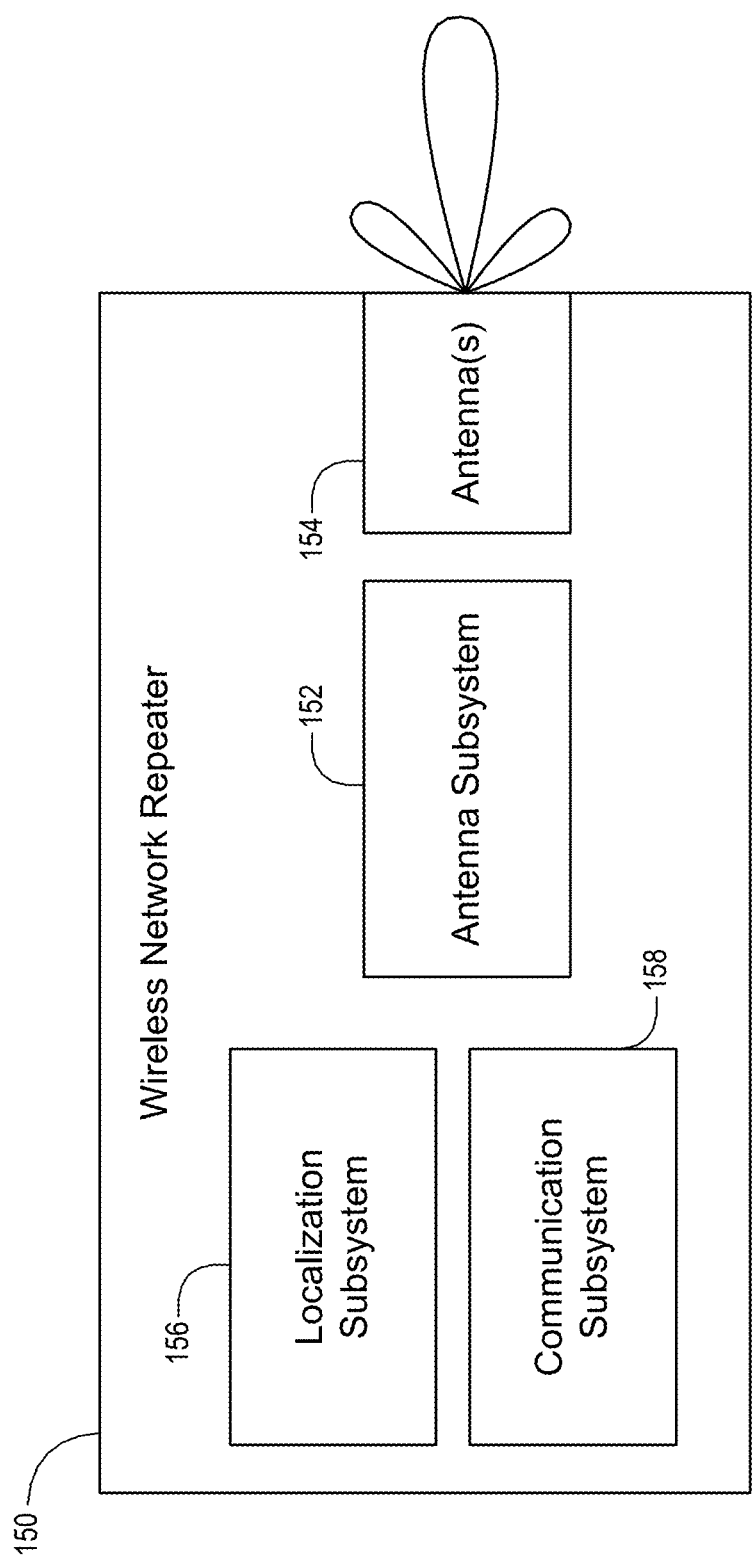
FIG. 1B illustrates a block diagram of a wireless network repeater, according to one embodiment.

FIG. 1B illustrates a block diagram of a wireless network repeater 150, according to one embodiment. As illustrated, the wireless network repeater 150 includes an antenna subsystem 152, one or more antennas 154, a localization subsystem 156, and a communication subsystem 158. According to various embodiments, the antenna subsystem 152 and associated antenna(s) 154 facilitate image sensing and wireless network communications.

The localization subsystem 156 operates to determine a location of a wireless base station (e.g., a gNodeB within a 5G network) within a defined region using a computational imaging approach. The antenna subsystem 152 and associated antenna(s) 154 may, for example, comprise a tunable metamaterial antenna or another selectively tunable beamforming antenna architecture. The antenna(s) 154 are configured to generate high directive single beams as well as beam superpositions that can be used for computational imaging.

The systems and methods described herein allow for target localization (e.g., identification of the relative location of a gNodeB) via computational image sensing and computational approaches that, when compared with raster-scan target localization techniques, (1) require fewer measurements, (2) exhibit reduced power consumption, (3) reduce the scanning/sensing time, (4) reduce the computing time, and (5) provide a high level of accuracy (equivalent to that of a raster-scan target localization).

In many embodiments, target localization is accomplished using computational image sensing using a sensing frequency within the operational frequency band of the wireless base station. For example, sensing frequencies may be used for target localization to identify the location of a gNodeB operating in Frequency Range 1 (FR1) that includes sub-6 Ghz frequency bands (e.g., 410 MHz to 7,125 MHz) or Frequency Range 2 (FR2) that includes frequency bands from 24.25 GHz to 52.6 GHz (e.g., "millimeter-wave range"). It is appreciated that the wireless network repeater 150 may be adapted to utilize a sensing frequency within any other operating frequency band of a gNodeB or other wireless base station, in accordance with the same principles of operation described herein.

Once the relative location of the wireless base station is identified (e.g., specified as an azimuth angle and/or elevation angle), the communication subsystem 158 may adjust a steering angle of an antenna 154 associated with the antenna subsystem 152. In some embodiments, a single antenna may be used for computational image sensing and subsequent communication. In other embodiments, a first set of one or more antennas is used for computational image sensing, while a different set of one or more antennas is used for wireless communication.

For example, the antenna subsystem 152 may include a first millimeter-wave holographic beamforming antenna for image sensing and a second millimeter-wave holographic beamforming antenna for network communications. In still other embodiments, the antenna subsystem 152 may utilize sub-apertures of a single holographic beamforming antenna to generate beam superpositions for computational image sensing and use the entire aperture of the same holographic beamforming antenna for subsequent wireless communication.

Figure 2A:
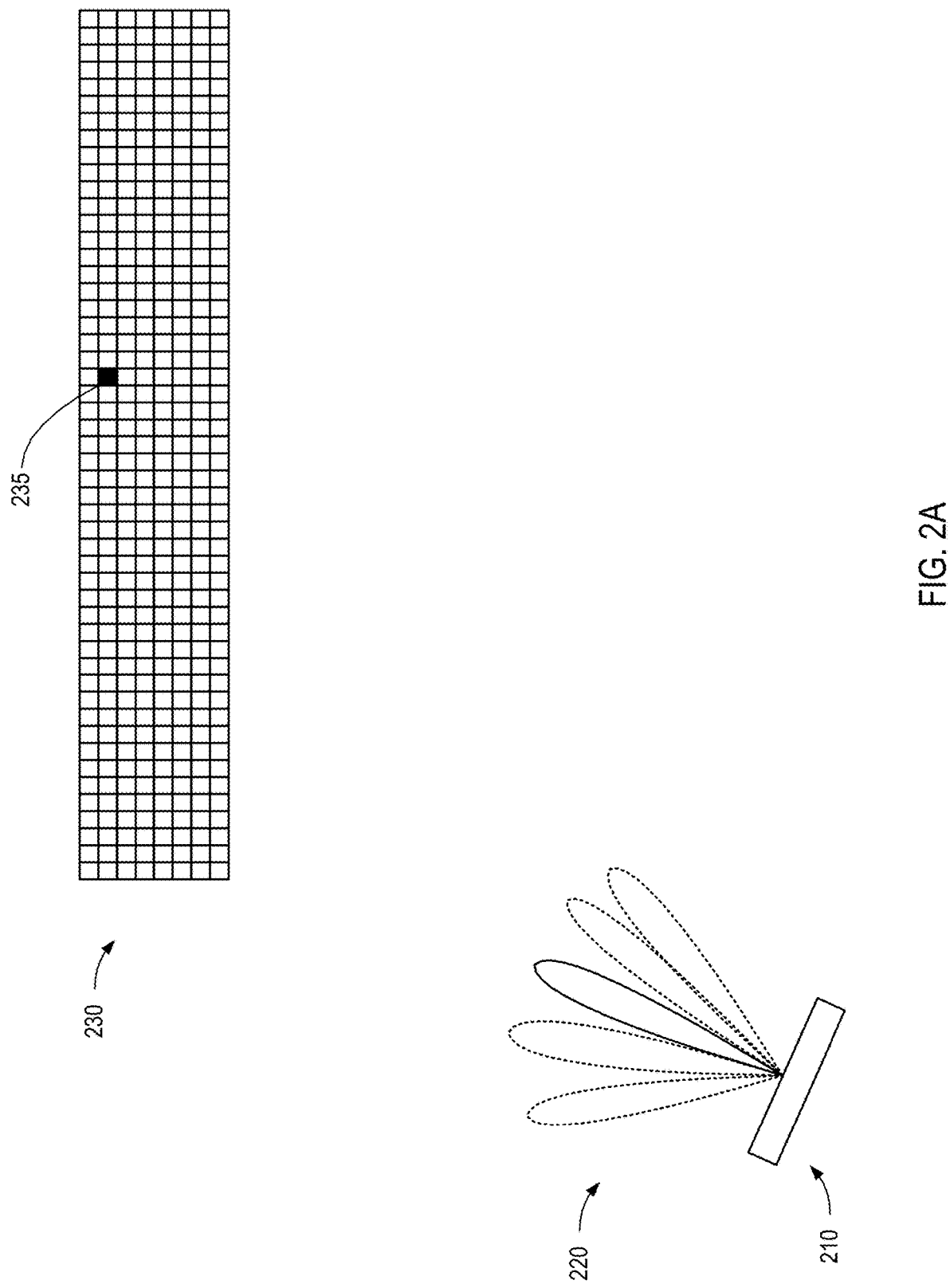
FIG. 2A is an example illustration of a wireless network repeater determining a location of a gNodeB, according to one embodiment.

FIG. 2A is an example illustration of a wireless network repeater 210 determining a location of a gNodeB 235 within a region 230 defined in terms of azimuth and elevation, according to one embodiment. An effective "pixel size" of discrete locations within the region 230 are represented by boxes and correspond to a sensing beamwidth, and optionally a communication beamwidth (especially in embodiments in which the same holographic beamforming antenna is used for both computational image sensing target localization and subsequent wireless communication). The wireless network repeater 210 generates a series of orthogonal beams 220 that illuminate the entire region 230.

For example, the wireless network repeater 210 may generate orthogonal beams 220 with beam superpositions selected through an optimization technique to reduce or even eliminate redundant or duplicative sensing of a "pixel" location within the region 230. In one embodiment, the wireless network repeater 210 uses JOpt optimization techniques to identify a set of orthogonal beam superpositions for computational image sensing using left and right sub-apertures of a holographic beamforming antenna.

Figure 2B:
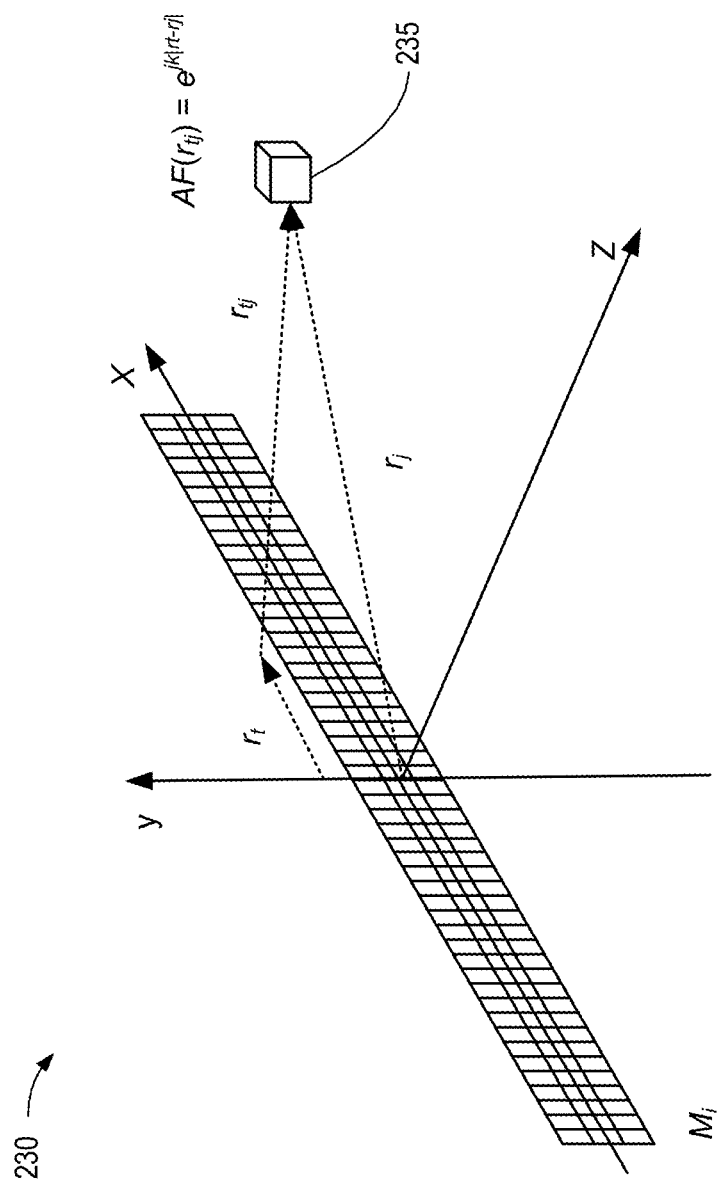
FIG. 2B illustrates a mathematical representation of the location of the gNodeB within the region, according to one embodiment.

FIG. 2B illustrates a mathematical representation of the location 235 of the gNodeB within the region 230 for use in a computational imaging algorithm with a sensing matrix $\overline{\overline{H}}$ of beamform transmission values, according to one embodiment. According to various embodiments, the wireless network repeater utilizes a computational imaging algorithm based on a sensing matrix $\overline{\overline{H}}$, which is calculated based on the fields projected from the transmitting (Tx) and receiving (Rx) HBF antenna(s). A forward model of the Tx/Rx fields is utilized with the signal $\overline{\sigma}$ transmitted by the wireless base station, which corresponds to a target reflectivity in conventional imaging. A set of measurements $\overline{g}$ can be represented as:

$$\overline{g} = \overline{\overline{H}}\overline{\sigma} \qquad \text{Equation 1}$$

In Equation 1, the scene and detection vectors $\overline{\sigma}$ and $\overline{g}$ are discretized based on the beamwidth. Assuming a Born approximation (weak scatterers), entries of $\overline{\overline{H}}$ are written as a dot product between transmitted and received fields as:

$$H_{ij} = E_i^{TX}(r_j) \cdot E_i^{RX}(r_j) \qquad \text{Equation 2}$$

In Equation 2, quantities $E_i^{TX}$ and $E_j^{RX}$ are defined as transmit (Tx) and receive (Rx) electric fields for an i-th hologram and a j-th location. The $r_j$ correspond to the angle pairs (azimuth and elevation) of the region 230. The electric fields can be represented by far-field propagation of the fields created at the aperture for each fixed hologram state, more explicitly as:

$$E_i^{TX}(r) = \Sigma_1^T M_i(x_t) AF(r_{tj}) \qquad \text{Equation 3}$$

In Equation 3, $M_i$ corresponds to the i-th fixed hologram state, $x_t$ corresponds to a location of the t-th element in an HBF aperture array, and $AF(r_{tj})$ corresponds to an array factor calculation between the t-th element and the j-th pixel, as illustrated.

Figure 3B:
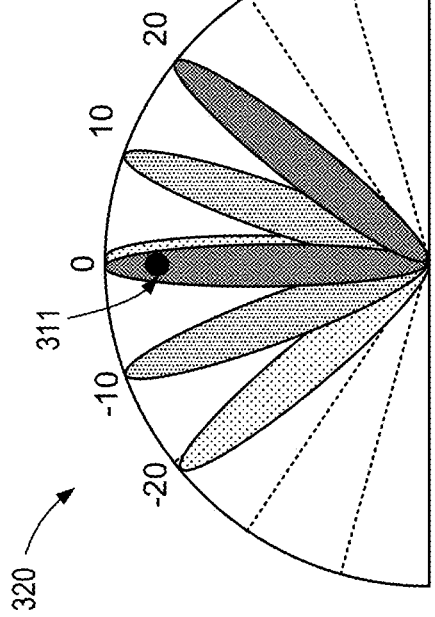
FIG. 3B illustrates an example sensing matrix, according to one embodiment.
Figure 3A:
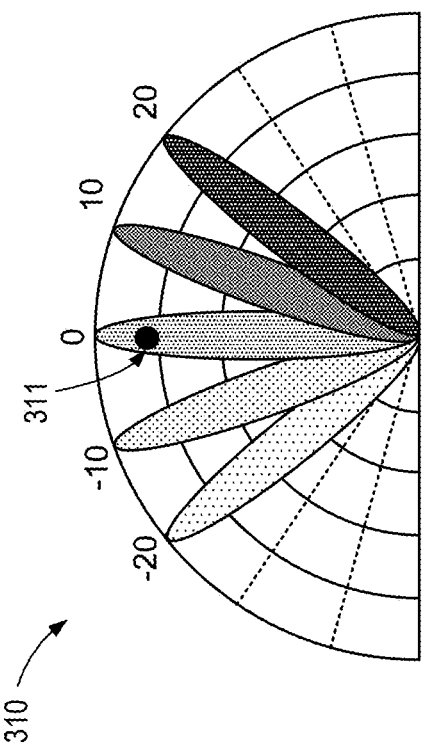
FIG. 3A illustrates a sensing matrix as an identity matrix when the detection and scene vectors are equal, according to one embodiment.

FIG. 3A illustrates a sensing matrix $\overline{\overline{H}}$ 315 as an identity matrix when the detection vector $\overline{g}$, and scene vector $\overline{\sigma}$, are equal, according to one embodiment. The detection vector $\overline{g}$ is considered "equal" to the scene vector $\overline{\sigma}$, when the transpose of the detection column vector $\overline{g}$ is identical (when normalized or substantially identical before normalization) to the scene row vector $\overline{\sigma}$. Each row of the sensing matrix $\overline{\overline{H}}$ 315 corresponds then to the measured beam scans for all angle pairs (azimuth, elevation) in a region 310 for a fixed hologram state.

Illustrated beamforms within the region 310 and the associated sensing matrix $\overline{\overline{H}}$ 315 correspond to a simplified raster-scan measurement with five beamforms sequentially generated by a holographic beamforming antenna. The beamforms are illustrated with different shadings to represent the successive generation during the raster scan of the region 310. With each measurement i corresponding to a fixed angle pair, the sensing matrix $\overline{\overline{H}}$ can be approximated to the identity matrix, and the detection vector $\overline{g}$ and the scene vector $\overline{\sigma}$ are equal. The detection vector $\overline{g}$ has null values for each beamform that did not receive a reflection or signal, and a normalized value of 1 for each beamform that illuminated the wireless base station (illustrated as black dot 311).

FIG. 3B illustrates an example sensing matrix $\overline{\overline{H}}$ 325 when the holographic beam forming antennas (or sub-apertures of a single antenna) generate two beamforms for each measurement, according to one embodiment. In this case, the sensing matrix $\overline{\overline{H}}$ 325 has fewer rows since the wireless network repeater illuminates an entire region 320 with fewer measurements. The illustrated embodiment includes matched shadings to represent the successive generation of beamform pairs. With two measurements in each row of the sensing matrix $\overline{\overline{H}}$ 325, the transpose of the detection column vector $\overline{g}$ is not equal to the scene row vector $\overline{\sigma}$. The wireless network repeater implements a computational image processing algorithm, as described herein, to retrieve the actual "image" that identifies the angle pair (azimuth, elevation) coordinates at which the target is located.

The wireless network repeater can estimate the scene row vector $\overline{\sigma}$ by inverting Equation 1. However, the sensing matrix $\overline{\overline{H}}$ 325 associated with the computational imaging is an ill-conditioned matrix and does not have an exact, computable inverse. In some embodiments, the wireless network repeater approximates the pseudo-inverse of the sensing matrix $\overline{\overline{H}}^{-1}$ as the conjugate transpose of the sensing matrix $\overline{\overline{H}}$. In other embodiments, such as when the sensing matrix $\overline{\overline{H}}$ is composed of the actual measurements of the radiated fields, the wireless network repeater computes a high-fidelity estimate of the pseudo-inverse of the sensing matrix $\overline{\overline{H}}^{-1}$ using Singular Value Decomposition (SVD) techniques. The wireless network repeater may, for example, factorize the sensing matrix $\overline{\overline{H}}$ 325 as:

$$\overline{\overline{H}} = \overline{\overline{U}} \overline{\overline{\Sigma}} \overline{\overline{V}}^{\dagger} \qquad \text{Equation 4}$$

In Equation 4, the † stands for a complex conjugate operator, and U and V are unitary matrices made of an orthonormal set of bases, weighted by the singular values $s_1$, $s_2 \ldots s_N$, ordered from largest to smallest in the diagonal matrix $\Sigma$. Under this factorization, the pseudo-inverse is defined as:

$$\overline{\overline{H}}^{-1} = \overline{\overline{U}}^{\dagger} \overline{\overline{\Sigma}}^{-1} \overline{\overline{V}} \qquad \text{Equation 5}$$

In Equation 5, $\Sigma^{-1}$ is a diagonal matrix with elements $1/s_1$, $1/s_2 \ldots 1/s_N$. When all the singular values are equal, the vectors of the orthogonal bases U and V are equally weighted in the signal reconstruction, indicating that, for each hologram, the radiation patterns are spatially independent. As such, $s_1 = s_2 = \ldots s_N = 1$, such that the singular value spectrum is flat. With the sensing matrix $\overline{\overline{H}}$ 325 calculated and the pseudo-inverse computed, the wireless network repeater "reconstructs the image" by calculating an estimated scene row vector $\overline{\sigma_{est}}$ as:

$$\overline{\sigma_{est}} = \overline{\overline{H}}^{-1} \overline{g} \qquad \text{Equation 6}$$

The wireless network repeater identifies the location of the wireless base station as being located at the angle pair (azimuth, elevation) corresponding to the highest value in the estimated scene row vector $\overline{\sigma_{est}}$.

Figure 4A:
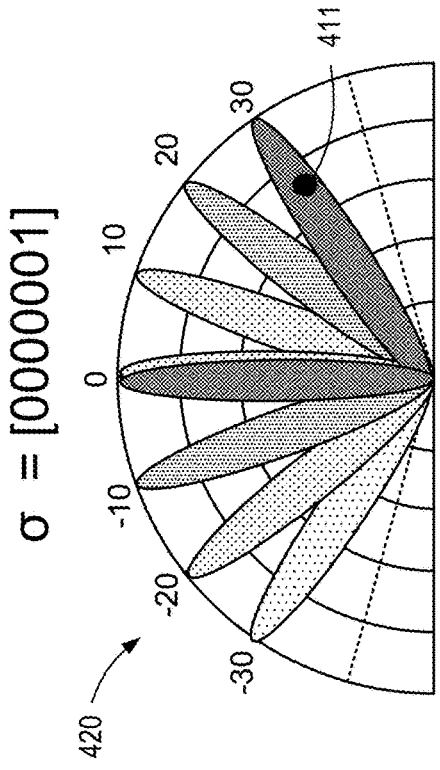
FIG. 4A illustrates another example of a sensing matrix as an identity matrix when a detection vector and a scene vector are equal, according to one embodiment.

FIG. 4A illustrates another example of a sensing matrix $\overline{\overline{H}}$ 415 as an identity matrix when the detection vector $\overline{g}$ and the scene vector $\overline{\sigma}$ are equal, according to one embodiment. Illustrated beamforms within region 410 and the associated sensing matrix $\overline{\overline{H}}$ 415 correspond to a raster-scan measurement with seven beamforms sequentially generated by a holographic beamforming antenna. Again, the beamforms are illustrated with different shadings to represent the successive generation during the raster scan of the region 410. With each measurement i corresponding to a fixed angle pair, the sensing matrix $\overline{\overline{H}}$ 415 can be approximated to the identity matrix and the detection vector $\overline{g}$ and the scene vector $\overline{\sigma}$ are equal. Again, the detection vector $\overline{g}$ has null values for each beamform that did not receive a reflection or signal, and a normalized value of 1 for each beamform that illuminated the wireless base station (illustrated as black dot 411).

Figure 4B:
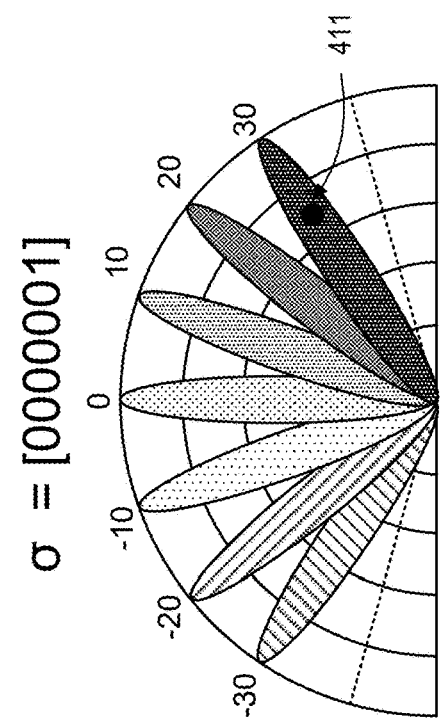
FIG. 4B illustrates another example sensing matrix, according to one embodiment.

FIG. 4B illustrates another example of a sensing matrix $\overline{\overline{H}}$ 425 when the holographic beamforming antennas generate two beamforms for each measurement, according to one embodiment. In this instance, region 420 is illuminated with four measurements (as illustrated by the matched shadings used for the beamform pairs, overlapping at zero degrees). As described in conjunction with FIG. 3B, the transpose of the detection vector $\overline{g}$ is not equal to the scene vector $\overline{\sigma}$, so the wireless network repeater calculates a pseudo-inverse of the sensing matrix $\overline{\overline{H}}^{-1}$ using SVD.

The wireless network repeater estimates a scene row vector $\overline{\sigma}$ using the pseudo-inverse of the sensing matrix $\overline{\overline{H}}^{-1}$. Again, the wireless network repeater identifies the location of the wireless base station as being located at the angle pair (azimuth, elevation) corresponding to the highest value in the estimated scene row vector $\overline{\sigma}$. FIGS. 3B and 4B are similar to one another but include a different number of beamform pairs (measurements). It is appreciated that the systems, methods, and principles disclosed herein may be expanded to encompass any number of beamform pairs to measure the signal or "reflection" from any number of discrete azimuth and elevation angles.

Figure 5A:
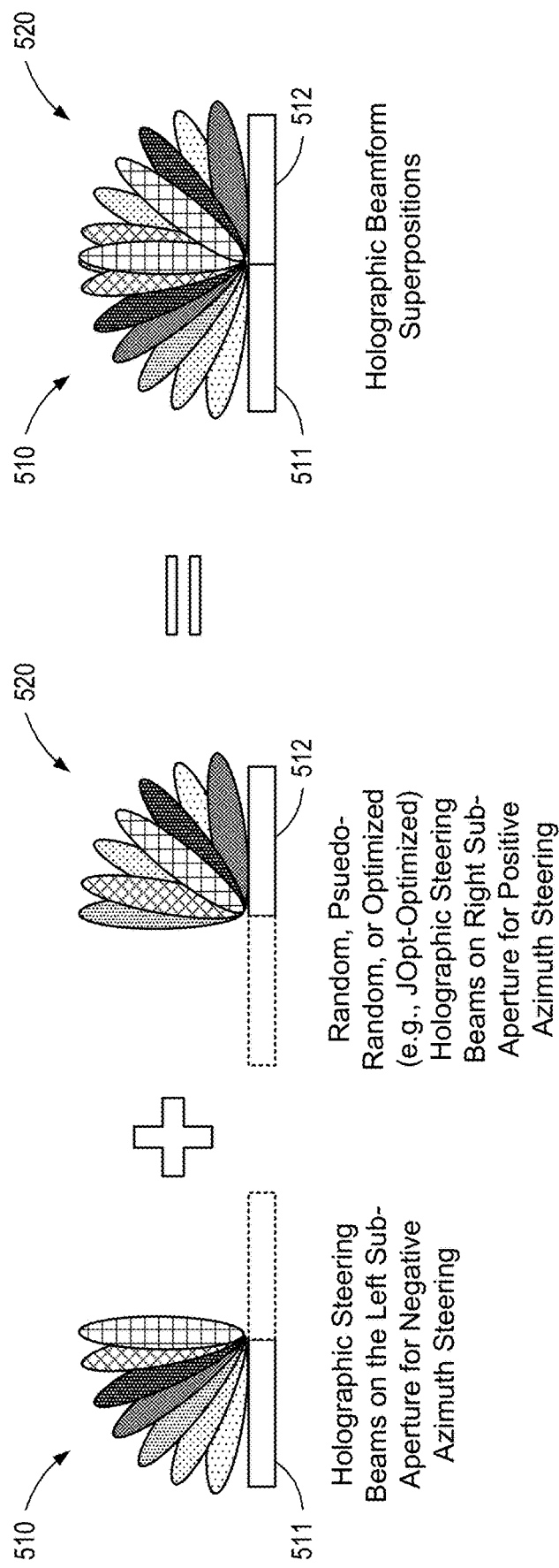
FIG. 5A illustrates a set of beamforms generated on a left sub-aperture of an antenna and a corresponding set of random or arbitrarily assigned beamforms generated on a right sub-aperture of the antenna, according to one embodiment.

FIG. 5A illustrates a first set of beamforms 510 generated on a left sub-aperture 511 of an antenna and a corresponding set of random or arbitrarily assigned beamforms 520 generated on a right sub-aperture 512 of the antenna, according to one embodiment. According to various embodiments, the order of the beamforms and/or the left and right sub-apertures may be switched. One sub-aperture (illustrated as the right sub-aperture 512 in the example depiction) may be used to transmit random, pseudo-random, arbitrarily assigned, or optimized (e.g., using a JOpt optimization algorithm) beamforms 520 corresponding to the beamforms (e.g., ordered beamforms 510) transmitted via the other sub-aperture (illustrated as the left sub-aperture 511 in the example depiction).

In one example implementation, an antenna operating at 24 GHz includes a linear array of tunable radiating elements fed by a guided wave from the center. The frequency bandwidth of the tunable center-fed antenna of the example implementation ranges from 24 GHz to 25.25 GHz with horizontal polarization. JOpt optimization techniques are utilized to select tuning parameters for the tunable radiating elements on the left sub-aperture (antenna elements to the left of the center feed) and the tunable radiating elements on the right sub-aperture (antenna elements to the right of the center feed). The JOpt-optimized tuning parameter confirmations are implemented (referred to as holograms or holographic values) to cause the left and right sub-apertures to generate highly directive beams for different azimuth values. As such, each implemented hologram generates two highly directive beams—one from the left sub-aperture at a negative azimuth angle and one from the right sub-aperture at a positive azimuth angle.

The switching speed from one hologram to another may be, for example, between approximately 30 milliseconds and 150 milliseconds, depending on the specific architecture of the antenna and the switching speed of the tunable radiating elements. In one specific embodiment, at a switching speed of 65 milliseconds, a raster scan with one hundred forty-one measurements at azimuth targets between −70 degrees and 70 degrees would take approximately ten seconds.

The presently described systems and methods reduce the scan time using computational imaging techniques. The wireless network repeater identifies the smallest or at least a smaller set of orthogonal holograms to cover the region. For example, the principle of superposition ensures that the superposition of two different JOpt holograms on each sub-aperture of the antenna will generate the radiation pattern of two distinct beams, thereby reducing the number of measurements by at least 50 percent.

Figure 5B:
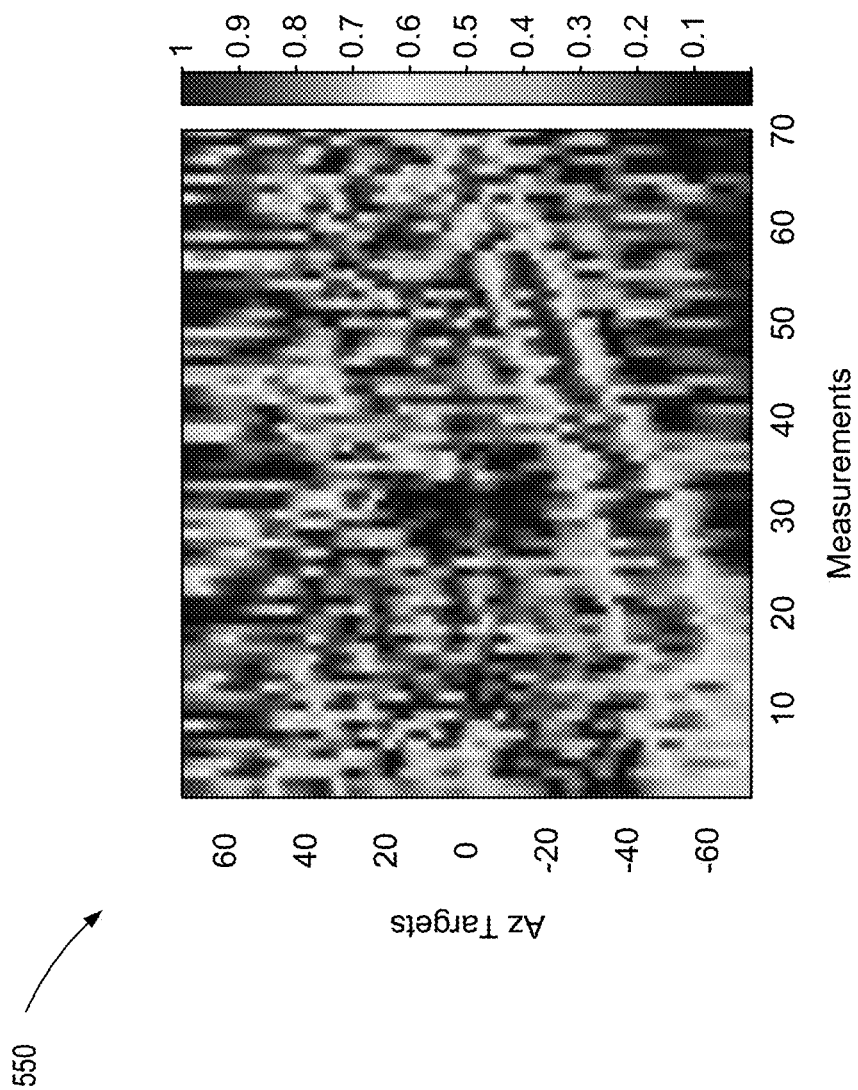
FIG. 5B illustrates the obtained sensing matrix using the sub-aperture divided antenna of FIG. 5A, according to one embodiment.

FIG. 5B illustrates the obtained sensing matrix $\overline{H}$ 550 using the sub-aperture divided antenna of FIG. 5A, according to one embodiment. The sensing matrix $\overline{H}$ 550 includes values for seventy measurements (horizontal axis) corresponding to azimuth targets between −70 degrees and 70 degrees (vertical axis). The sensing matrix $\overline{H}$ 550 was obtained by driving the left sub-aperture 511 of the antenna in FIG. 5A with a set of steering JOpt holograms 510 from −70 degrees to 0 degrees and driving the right sub-aperture 512 with a set of random azimuth targets from 1 to 70 degrees for the JOpt holograms 520 on the right sub-aperture 512.

FIG. 6A illustrates an example sensing matrix $\overline{H}$ 610 of one hundred forty-one measurement values from a raster scan of a region with azimuth values ranging from −70 degrees to 70 degrees, according to one embodiment. In the case of a raster scan, the sensing matrix $\overline{H}$ 610 is square, as the number of measurements is equal to the number of azimuth target locations. However, the inverse of the sensing matrix $\overline{H}$ 610 from the raster scan is ill-conditioned due to the noise and sidelobe levels in real-world applications that lead to redundant information.

FIG. 6B illustrates a graphical representation 620 of the truncation of the singular value decomposition of the raster scan sensing matrix $\overline{H}$ 610, according to one embodiment. As illustrated, the singular values of the raster scan sensing matrix $\overline{H}$ 610 decreases by more than two orders of magnitude. The calculation of the inverse of these values results in the smallest singular values becoming the largest, which results in the effective magnification of the noise levels (as per Equation 4). To compensate, the system truncates the smallest singular values (which represent information about the noise in the system) in the singular value decomposition. The larger singular values (which represent information about the actual target) are retained.

In some embodiments, the system truncates the smallest ten percent of the singular values. In other embodiments, the system truncates singular values that are more than two orders of magnitude smaller than the largest singular value. In still other embodiments, the system truncates singular values that are more than two orders of magnitude smaller than the average of the top one to ten percent of the singular values. A tolerance value Tol may be utilized to select which singular values are retained. For example, only those singular values s that are greater than the product of the tolerance value Tol multiplied by the maximum absolute singular value may be retained, per Equation 7 below:

$$s > \text{Tol} * \max|s| \qquad \text{Equation 7}$$

In the illustrated embodiment, only the top ten percent of the singular values represented by solid line 621 are retained and the bottom ninety percent of the singular values represented by the dashed line 623 are truncated and discarded. Again, the singular values correspond to the weighting factors of the orthogonal basis in the U and V matrices in Equations 4 and 5 that contain information about the fields in the region. Retaining more singular values results in more information being extracted about the target, but also results in magnification of the noise in the image (since the smallest singular values correspond to the noise floor). According to various embodiments, the systems and methods described herein utilize a tolerance threshold of between five percent and twenty-five percent that allows for adequate noise reduction while still retaining sufficient target information for accurate localization.

FIG. 6C illustrates the inverse matrix $\overline{H}^{-1}$ 630 of the raster scan sensing matrix $\overline{H}$ 610 after truncating the bottom ninety percent of the singular values 623, according to one embodiment. As illustrated, even when using only the top ten percent of the singular values 621, the inverse matrix $\overline{H}^{-1}$ 630 of the raster scan sensing matrix $\overline{H}$ 610 contains sufficient information for subsequent computation and testing against a detection vector. Given the truncation of the bottom ninety percent of the singular values 623, the inverse matrix $\overline{H}^{-1}$ 630 might be more accurately referred to as a "pseudo-inverse" and the terms are contextually used interchangeably throughout this disclosure.

Figure 7C:
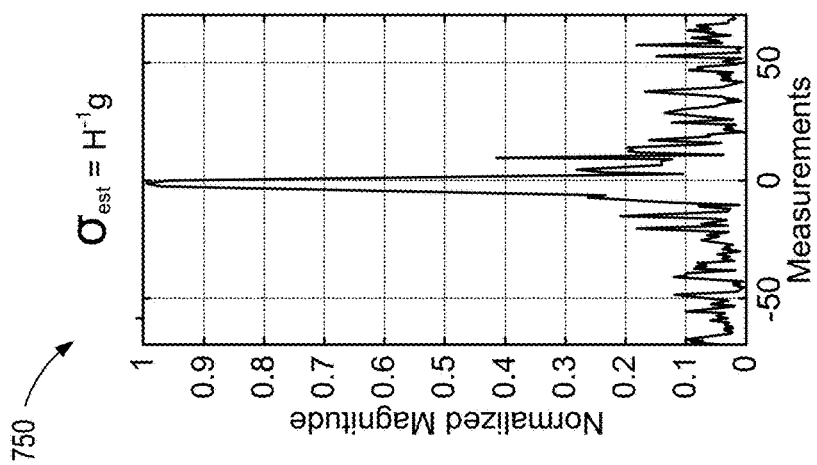
FIG. 7C illustrates a scene vector calculated as the product of the inverse of the raster scan sensing matrix and the detection vector of FIGS. 7A and 7B, according to one embodiment.
Figure 7B:
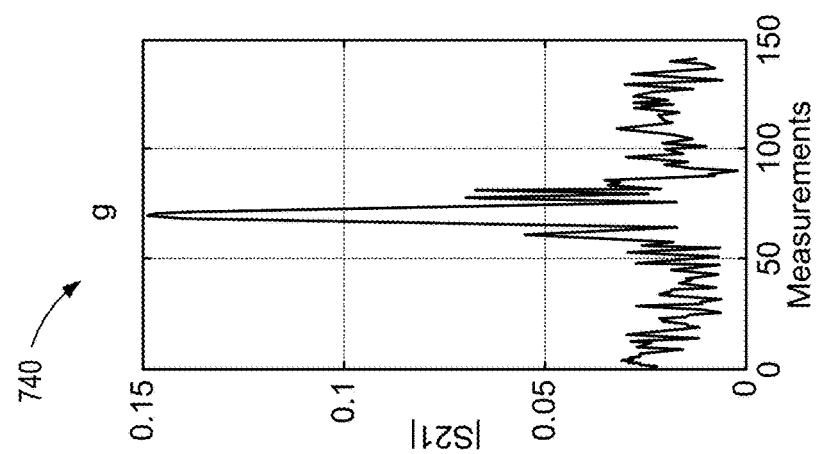
FIG. 7B illustrates a detection vector obtained during the raster scan, according to one embodiment.
Figure 7A:
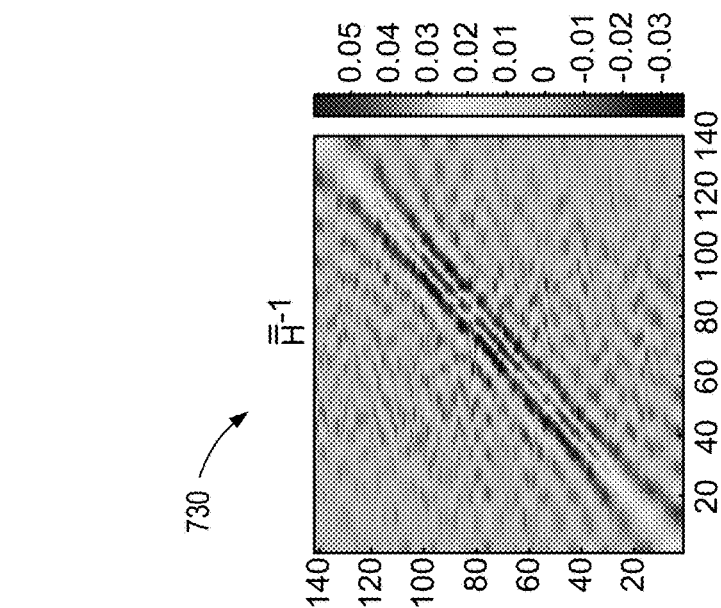
FIG. 7A illustrates the inverse of a raster scan sensing matrix, according to one embodiment.

FIG. 7A illustrates the inverse matrix $\overline{H}^{-1}$ 730 of a raster scan sensing matrix $\overline{H}$ with 141 measurements after singular value decomposition and truncation, according to one embodiment. The illustrated inverse matrix $\overline{H}^{-1}$ 730 may be, for example, obtained as described in conjunction with the embodiments of FIGS. 5A-6C using the algorithms discussed in conjunction with Equations 3-5.

FIG. 7B illustrates a graph 740 of the detection vector $\overline{g}$ of the 141 measurements obtained during the raster scan, according to one embodiment. With the raster scan, the graph 740 of the detection vector $\overline{g}$ provides a clear depiction of the target localization at the peak detection value at measurement number 70 corresponding to the sensing azimuth angle of 0 degrees.

FIG. 7C illustrates the scene vector $\overline{\sigma}$ calculated as the product of the inverse matrix $\overline{H}^{-1}$ of the raster scan sensing matrix $\overline{H}$ and the detection vector $\overline{g}$ of FIGS. 7A and 7B, according to one embodiment. The system accurately identifies the wireless base station as being located at the azimuth angle corresponding to the highest value in the scene vector $\overline{\sigma}$. The examples described in conjunction with FIGS. 6A-7C for a raster scan demonstrate the accuracy and functionality of the localization processes, computations, and algorithms proposed in this disclosure.

FIGS. 8A-12C provide examples of the same localization processes, computations, and algorithms applied to antenna systems using computational imaging with simultaneously transmitted pairs of holographic beamforms. The specific embodiments and examples described herein contemplate the use of beamform pairs transmitted at negative and positive azimuth angles. However, it is appreciated that the presently described systems and methods can be adapted for computational imaging processing using any number of concurrent orthogonal beamforms to measure response within a region of interest. Moreover, the examples and embodiments are described in terms of different azimuth angles. However, it is appreciated that the presently described systems and methods can be used for target localization in terms of both azimuth and elevation, as, for example, described above in terms of angle pairs of azimuth and elevation.

Figure 8A:
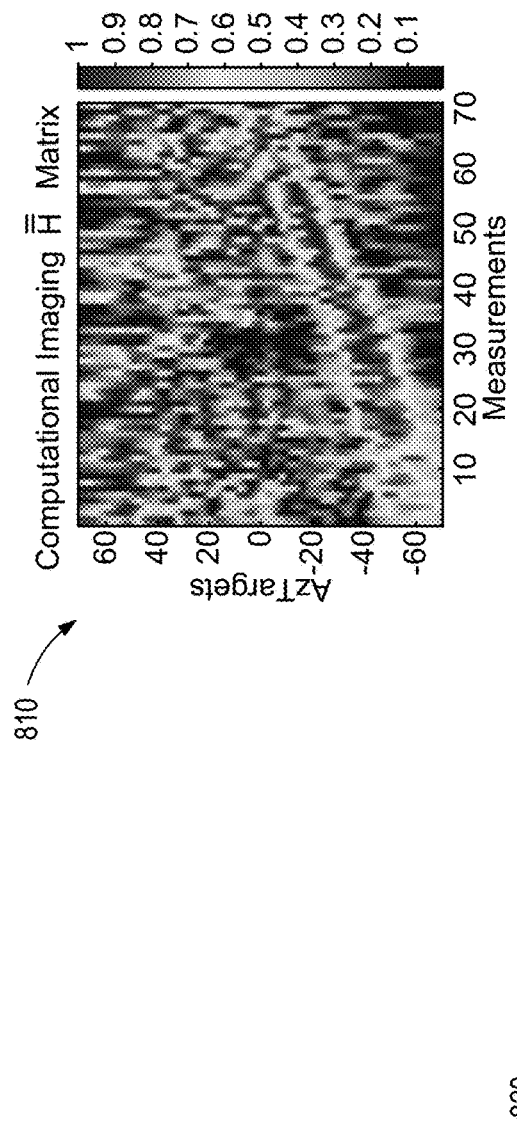
FIG. 8A illustrates an example sensing matrix of measurement values from a computational imaging scan, according to one embodiment.

FIG. 8A illustrates an example of a sensing matrix $\overline{\overline{H}}$ 810 of measurement values from a computational imaging (CI) scan with seventy measurements, according to one embodiment. The illustrated sensing matrix $\overline{\overline{H}}$ 810 is similar to that described in conjunction with FIGS. 5A and 5B.

Figure 8C:
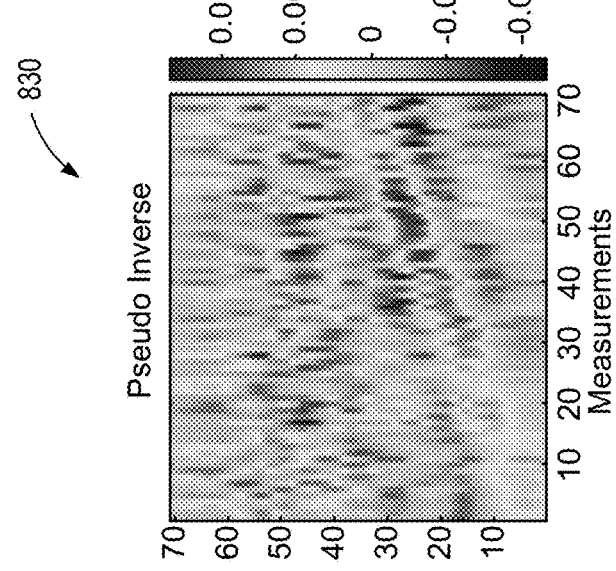
FIG. 8C illustrates a pseudo-inverse of the computational imaging scan sensing matrix, according to one embodiment.
Figure 8B:
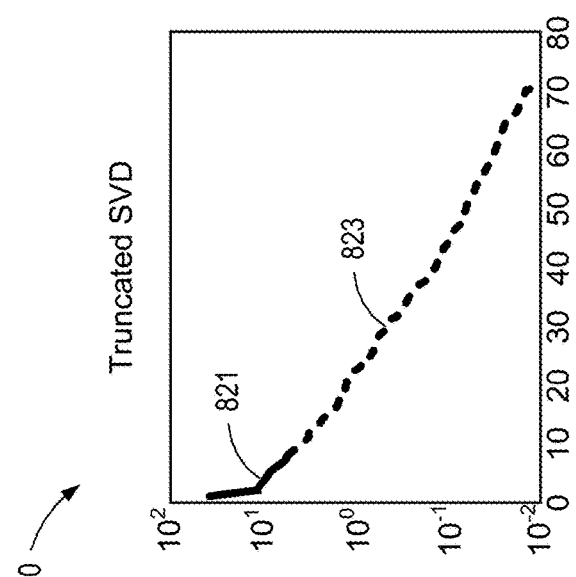
FIG. 8B illustrates a graphical representation of the truncation of a singular value decomposition of the computational imaging scan sensing matrix, according to one embodiment.

FIG. 8B illustrates a graphical representation 820 of the truncation of the singular value decomposition of the computational imaging scan sensing matrix $\overline{\overline{H}}$ 810, according to one embodiment. As illustrated, only the top ten percent of the singular values represented by solid line 821 are retained and the bottom ninety percent of the singular values represented by the dashed line 823 are truncated and discarded. As previously described, higher or lower percentages of the singular values may be retained based on, for example, a function (e.g., a weighted function) of the sensing frequency used, the directivity of the beamforms, achievable sidelobe suppression, and/or the number of measurements taken.

FIG. 8C illustrates the pseudo-inverse matrix $\overline{\overline{H}}^{-1}$ 830 of the computational imaging scan sensing matrix $\overline{\overline{H}}$ 810, according to one embodiment. The system may, for example, calculate the pseudo-inverse matrix $\overline{\overline{H}}^{-1}$ 830 as described in conjunction with Equations 3-5 above.

Figures 9A, 9B, 9C:
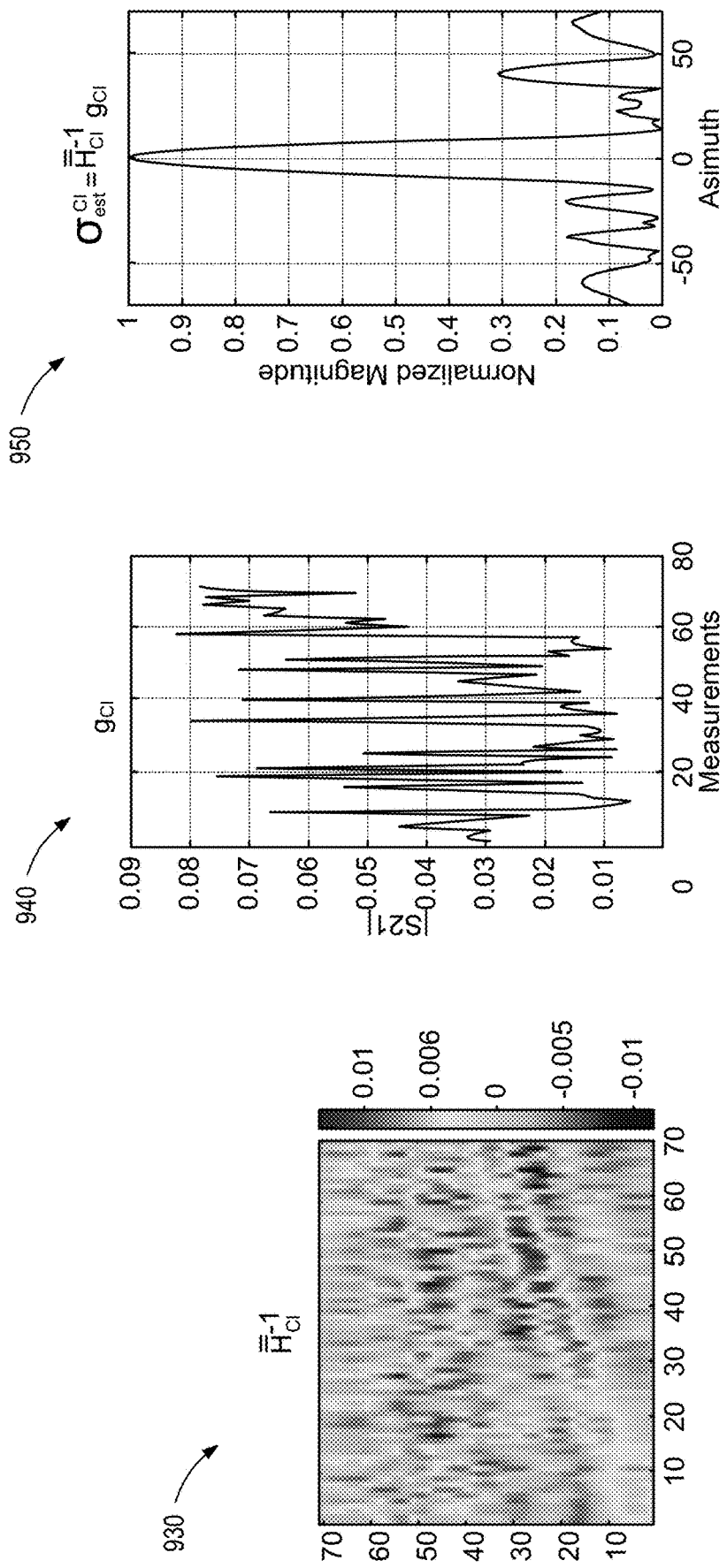
FIG. 9A illustrates a pseudo-inverse of a computational imaging scan sensing matrix with 70 measurements, according to one embodiment.
FIG. 9B illustrates a detection vector of the measurements obtained during the computational imaging scan with 70 measurements, according to one embodiment.
FIG. 9C illustrates a scene vector calculated as the product of the pseudo-inverse of the computational imaging scan sensing matrix and the detection vector of FIGS. 9A and 9B, according to one embodiment.

FIG. 9A illustrates the pseudo-inverse matrix $\overline{\overline{H}}^{-1}$ 930 of a computational imaging scan sensing matrix $\overline{\overline{H}}$ with seventy measurements, according to one embodiment. The illustrated pseudo-inverse matrix $\overline{\overline{H}}^{-1}$ 930 may be, for example, obtained as described in conjunction with the embodiments of FIGS. 5A-6C and FIGS. 8A-8C using the algorithms discussed in conjunction with Equations 3-5.

FIG. 9B illustrates a graph of the detection vector $\overline{g}$ 940 of the measurements obtained during the computational imaging scan with seventy measurements, according to one embodiment. Unlike the graph of the detection vector $\overline{g}$ 740 for the raster scan in FIG. 7B, the graph of the detection vector $\overline{g}$ 940 does not provide a visualization with an immediately obvious selection for the target localization. That is, the detection vector $\overline{g}$ 940 associated with the computational imaging scan has many peaks and troughs.

FIG. 9C illustrates a graph of an estimated scene vector $\overline{\sigma_{est}}$ 950 calculated as the product of the pseudo-inverse matrix $\overline{\overline{H}}^{-1}$ 930 of the computational imaging scan sensing matrix $\overline{\overline{H}}$ and the detection vector $\overline{g}$ 940 of FIGS. 9A and 9B, according to one embodiment. The system accurately identifies the localization target (e.g., the wireless base station) as being located at the azimuth angle (or angle pair of azimuth and elevation angles) corresponding to the highest value in the estimated scene vector $\overline{\sigma_{est}}$ 950.

Even when the detection vector $\overline{g}$ 940 does not show or visually indicate any initial guess on the target location, the reconstructed image in the estimated scene vector $\overline{\sigma_{est}}$ 950 reveals the target location. The reconstructed image provides an accurate image of the scene (including the location of the target) since the superposition of the beamforms used to measure most or even all possible azimuth targets in the region. As such, even when the beamforms are not narrow enough for a one-to-one mapping, the combined measurements contribute to the illumination of the region and therefore, to an accurate image of the target location.

FIG. 10A illustrates the pseudo-inverse matrix $\overline{\overline{H}}^{-1}$ 1030 of a computational imaging scan sensing matrix $\overline{\overline{H}}$ with thirty measurements, according to one embodiment. The illustrated pseudo-inverse matrix $\overline{\overline{H}}^{-1}$ 1030 may be, for example, obtained as described in conjunction with the embodiments of FIGS. 5A-6C and FIGS. 8A-8C using the algorithms discussed in conjunction with Equations 3-5.

FIG. 10B illustrates a graph of the detection vector $\overline{g}$ 1040 of the measurements obtained during the computational imaging scan with thirty measurements, according to one embodiment.

FIG. 10C illustrates a graph of an estimated scene vector $\overline{\sigma_{est}}$ 1050 calculated as the product of the pseudo-inverse matrix $\overline{\overline{H}}^{-1}$ 1030 of the computational imaging scan sensing matrix $\overline{\overline{H}}$ and the detection vector $\overline{g}$ 1040 of FIGS. 10A and 10B, according to one embodiment. The system identifies the localization target (e.g., the wireless base station) as being located at the angle pair of azimuth and elevation angles corresponding to the highest value in the estimated scene vector $\overline{\sigma_{est}}$ 1050.

FIG. 11A illustrates the pseudo-inverse matrix $\overline{\overline{H}}^{-1}$ 1130 of a computational imaging scan sensing matrix $\overline{\overline{H}}$ with twenty measurements, according to one embodiment. The illustrated pseudo-inverse matrix $\overline{\overline{H}}^{-1}$ 1130 may be, for example, obtained as described in conjunction with the embodiments of FIGS. 5A-6C and FIGS. 8A-8C using the algorithms discussed in conjunction with Equations 3-5.

FIG. 11B illustrates a graph of the detection vector $\overline{g}$ 1140 of the measurements obtained during the computational imaging scan with twenty measurements, according to one embodiment.

FIG. 11C illustrates a graph of an estimated scene vector $\overline{\sigma_{est}}$ 1150 calculated as the product of the pseudo-inverse matrix $\overline{\overline{H}}^{-1}$ 1130 of the computational imaging scan sensing matrix $\overline{\overline{H}}$ and the detection vector $\overline{g}$ 1140 of FIGS. 11A and 11B, according to one embodiment. The system identifies the localization target (e.g., the wireless base station) as being located at the angle pair of azimuth and elevation angles corresponding to the highest value in the estimated scene vector $\overline{\sigma_{est}}$ 1150.

FIG. 12A illustrates the pseudo-inverse matrix $\overline{\overline{H}}^{-1}$ 1230 of a computational imaging scan sensing matrix $\overline{\overline{H}}$ with only ten measurements, according to one embodiment. The illustrated pseudo-inverse matrix $\overline{\overline{H}}^{-1}$ 1230 may be, for example, obtained as described in conjunction with the embodiments of FIGS. 5A-6C and FIGS. 8A-8C using the algorithms discussed in conjunction with Equations 3-5.

FIG. 12B illustrates a graph of the detection vector $\overline{g}$ 1240 of the measurements obtained during the computational imaging scan with ten measurements, according to one embodiment.

FIG. 12C illustrates a graph of an estimated scene vector $\overline{\sigma_{est}}$ 1250 calculated as the product of the pseudo-inverse matrix $\overline{\overline{H}}^{-1}$ 1230 of the computational imaging scan sensing matrix $\overline{\overline{H}}$ and the detection vector $\overline{g}$ 1240 of FIGS. 12A and 12B, according to one embodiment. The system identifies the localization target (e.g., the wireless base station) as being located at the angle pair of azimuth and elevation angles corresponding to the highest value in the estimated scene vector $\overline{\sigma_{est}}$ 1250.

FIG. 13 illustrates a table 1300 with a first column of scan types 1310, a second column identifying the number of indices 1320 used on the sensing matrix $\overline{H}$ for each scan type 1310 in the first column, and a third column with normalized total times 1330 for target localization for each scan type 1310 in the first column. Each of the scan types 1310 in the first column is identified as corresponding to one of FIGS. 7A, 9A, 10A, 11A, and 12A. The total times 1330 in the third column are normalized to a value of 100 for a raster scan with 141 measurements.

In one example implementation, the actual time in seconds for the raster scan with 141 measurements and subsequent computation for target localization was approximately 88 seconds. It is appreciated that using antennas with different switching speeds, different computing and data storage hardware, and/or other modifications to the specific implementation may result in faster or slower target localization times. As illustrated, even the most comprehensive computational imaging scan with seventy measurements results in target localization in almost half the time. With ten measurements, the target localization time can be reduced by up to twelve times relative to raster-scan measurements.

Figure 14:
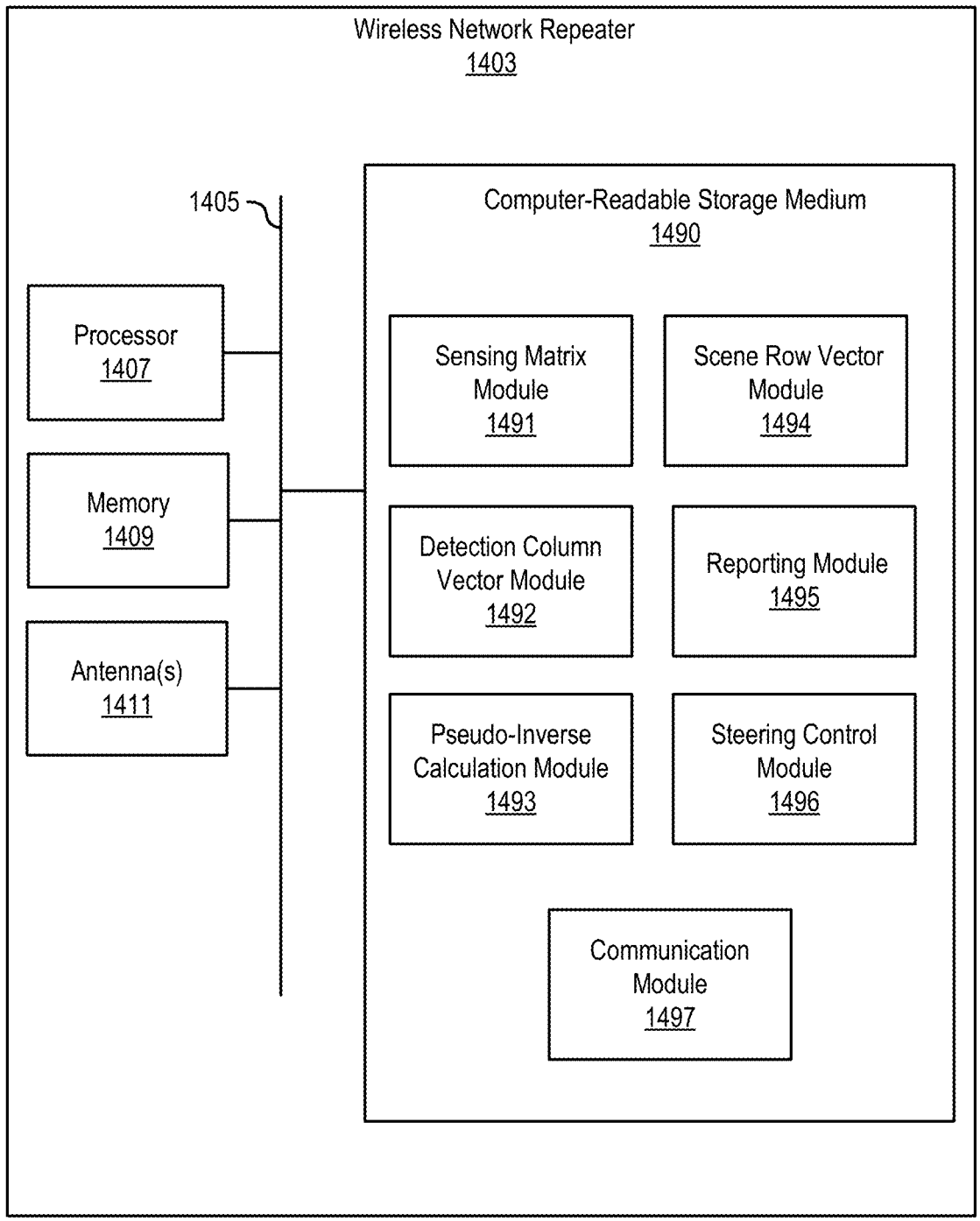
FIG. 14 illustrates a block diagram of a wireless network repeater with a processor to implement instructions stored in a non-transitory computer-readable medium, according to one embodiment.

FIG. 14 illustrates a block diagram of a wireless network repeater 1403 with a processor 1407, memory 1409, and antenna(s) 1411 connected to a computer-readable storage medium 1490. The processor 1407 may implement instructions stored within the computer-readable storage medium 1490 (e.g., a non-transitory computer-readable medium) to cause the antenna(s) 1411 to transmit beamforms, detect signals, and/or implement one- or two-directional wireless communication.

As illustrated, the computer-readable storage medium 1490 may include a sensing matrix module 1491 that, when executed by the processor 1407, causes the wireless network repeater 1403 to generate a sensing matrix $\overline{H}$ of beamform transmission values in which each row represents one of a plurality of holographic states of a holographic beamforming antenna (e.g., antenna(s) 1411) and each column represents one azimuth and elevation angle pair within a region.

As described herein, each holographic state of the holographic beamforming antenna (e.g., antenna(s) 1411) corresponds to at least two orthogonal beamforms steered to different angle pairs within the region. In some embodiments, the number of angle pairs in the region corresponds to the beamwidth of the beamforms generated by the holographic beamforming antenna to ensure sufficient scanning of the region occurs.

A detection column vector module 1492 includes instructions that, when executed by the processor 1407, cause the wireless network repeater 1403 to generate a detection column vector $\bar{g}$ of measured signal strengths of signals received from a telecommunication device in each holographic state of the holographic beamforming antenna.

A pseudo-inverse calculation module 1493 includes instructions that, when executed by the processor 1407, cause the wireless network repeater 1403 to calculate a pseudo-inverse matrix $\overline{H}^{-1}$ of the sensing matrix $\overline{H}$. A scene row vector module 1494 includes instructions that, when executed by the processor 1407, cause the wireless network repeater 1403 to estimate a scene row vector $(\overline{\sigma_{est}})$ as the product of the pseudo-inverse matrix $(\overline{H}^{-1})$ and the detection column vector $(\bar{g})$, wherein each element of the scene row vector $(\overline{\sigma_{est}})$ corresponds to an angle pair within the region.

A reporting module 1495 includes instructions that, when executed by the processor 1407, cause the wireless network repeater 1403 to report a location of the telecommunication device as the angle pair corresponding to the element having the highest value in the scene row vector $(\overline{\sigma_{est}})$. In addition to identifying and reporting the location of the telecommunication device, the wireless network repeater 1403 may steer or adjust a steering angle of a communication antenna (e.g., antenna(s) 1411), which may be a different antenna or the same antenna used for computational imaging and target localization.

For example, a steering control module 1496 may include instructions that, when executed by the processor 1407, cause the wireless network repeater 1403 to adjust a steering angle of a beamform of an antenna based on the identified angle pair location of the telecommunication device. A communication module 1497 may facilitate communication between the wireless network repeater 1403 and end devices and/or between the wireless network repeater 1403 and the telecommunication device (e.g., a gNodeB in a 5G wireless network).

Figure 15:
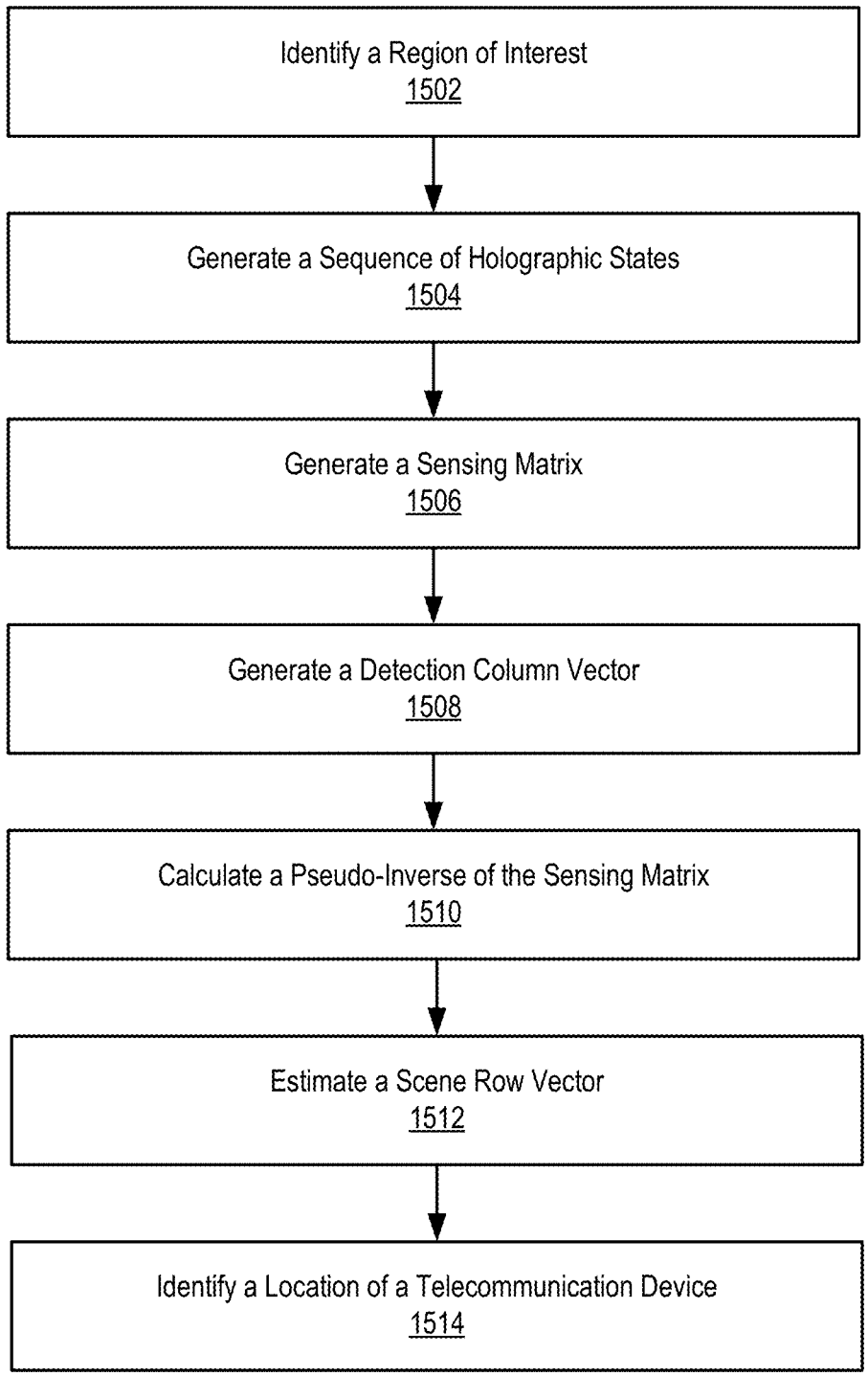
FIG. 15 illustrates a method of telecommunication target localization, according to one embodiment.

FIG. 15 illustrates a flow chart 1500 of a method of telecommunication target localization, according to one embodiment. As illustrated, a device may identify a region of interest, at 1502, within which to search for a telecommunication device, such as a gNodeB in a 5G wireless network. In various embodiments, the region of interest is definable in terms of discrete azimuth and elevation angle pairs. The number of discrete azimuth and elevation angle pairs may be selected to correspond to a beamwidth of steerable beamforms generated by a holographic beamforming antenna.

The device may generate, at 1504, a sequence of holographic states to be driven and implemented by a holographic beamforming antenna. As described herein, each holographic state corresponds to at least two orthogonal beamforms steered to different angle pairs within the region of interest. The device may generate a sensing matrix $\overline{H}$ of beamform transmission values, at 1506. In various embodiments, each row of the sensing matrix $\overline{H}$ corresponds to one of the holographic states and each column corresponds to one of the angle pairs in the region of interest.

The device may generate a detection column vector $\bar{g}$, at 1508, of measured signal strengths of signals received from the telecommunication device in each holographic state. The device may calculate a pseudo-inverse matrix $\overline{H}^{-1}$, at 1510. In accordance with the equations and algorithmic computations described herein, the device may then estimate a scene row vector $\overline{\sigma_{est}}$, at 1512. The estimated scene row vector $\overline{\sigma_{est}}$ may, for example, be calculated as the product of the pseudo-inverse matrix $\overline{H}^{-1}$ and the detection column vector $\bar{g}$. Each element of the estimated scene row vector $\overline{\sigma_{est}}$ corresponds to an angle pair within the region of interest. The system may identify, at 1514, the telecommunication device as being located at the angle pair corresponding to the element having the highest value in the estimated scene row vector $(\overline{\sigma_{est}})$.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. This disclosure should, therefore, be determined to encompass at least the following claims.

What is claimed is:

1. A wireless network repeater, comprising:
   an antenna subsystem;
   a localization subsystem to determine a location of a wireless base station within a region via computational imaging of the region using an image-sensing antenna of the antenna subsystem; and
   a communication subsystem to adjust a steering angle of a communication antenna of the antenna subsystem based on the location of the wireless base station as determined by the localization subsystem.

2. The wireless network repeater of claim 1, wherein the wireless base station comprises a millimeter-wave gNodeB base station of a fifth-generation (5G) network.

3. The wireless network repeater of claim 2, wherein the antenna subsystem comprises:
   a first millimeter-wave electrically adjustable antenna for image sensing, and
   a second millimeter-wave electrically adjustable antenna for network communications.

4. The wireless network repeater of claim 2, wherein the antenna subsystem comprises a single, millimeter-wave electrically adjustable antenna used by the localization subsystem as the image-sensing antenna and used by the communication subsystem as the communication antenna.

5. The wireless network repeater of claim 1, wherein to determine the location of the wireless base station via computational imaging the localization subsystem is configured to:
   generate, via a holographic beamforming antenna of the antenna subsystem, a sequence of holographic states, wherein each holographic state of the sequence of holographic states corresponds to at least two orthogonal beamforms steered to discrete azimuth and elevation angle pairs within the region;
   generate a sensing matrix $\bar{\bar{H}}$ of beamform transmission values in which each row represents one of the holographic states and each column represents one of the angle pairs in the region;
   generate a detection column vector $\bar{g}$ of measured signal strengths of signals received from the wireless base station in each holographic state;
   calculate a pseudo-inverse matrix $\bar{\bar{H}}^{-1}$ of the sensing matrix $\bar{\bar{H}}$;
   estimate a scene row vector $\bar{\sigma}$ as the product of the pseudo-inverse of the sensing matrix $\bar{\bar{H}}^{-1}$ and the detection column vector $\bar{g}$, wherein each element of the scene row vector $\bar{\sigma}$ corresponds to an angle pair within the region; and
   identify the wireless base station as being located at the angle pair corresponding to the element having the highest value in the scene row vector $\bar{\sigma}$.

6. The wireless network repeater of claim 5, wherein the localization subsystem is configured to calculate the pseudo-inverse matrix $\bar{\bar{H}}^{-1}$ via:
   a singular value decomposition factorization of the sensing matrix $\bar{\bar{H}}$ to determine singular values of the sensing matrix $\bar{\bar{H}}$;
   truncation of the singular values that are less than a tolerance percentage of a maximum magnitude of a singular value of the sensing matrix $\bar{\bar{H}}$; and
   calculation of the pseudo-inverse matrix $\bar{\bar{H}}^{-1}$ using the truncated singular values.

7. The wireless network repeater of claim 3, wherein the first millimeter-wave electrically adjustable antenna comprises a first holographic beamforming antenna, and wherein the second millimeter-wave electrically adjustable antenna comprises a second holographic beamforming antenna.

8. The wireless network repeater of claim 4, wherein the single, millimeter-wave electrically adjustable antenna comprises a holographic beamforming antenna.

9. A method for telecommunication target localization, comprising:
   identifying a region of interest within which to search for a telecommunication device, wherein the region of interest is definable in terms of discrete azimuth and elevation angle pairs;
   generating, via an adjustable beamforming antenna, a sequence of antenna states, wherein each antenna state of the sequence of antenna states corresponds to at least two orthogonal beamforms steered to different angle pairs within the region of interest; and
   identifying a location of a telecommunication device based on an analysis of a sensing matrix $\bar{\bar{H}}$ in which each row of the sensing matrix $\bar{\bar{H}}$ corresponds to one of the antenna states and each column sensing matrix $\bar{\bar{H}}$ corresponds to one of the angle pairs in the region of interest.

10. The method of claim 9, wherein the telecommunication device comprises a gNodeB (gNB) of a 5G network.

11. The method of claim 9, wherein each antenna state of the sequence of antenna states corresponds to at least three orthogonal beamforms steered to different angle pairs within the region of interest.

12. The method of claim 9, wherein a number of angle pairs corresponds to a beamwidth of steerable beamforms generated by at least one of:
   an electrically adjustable beamforming antenna; and
   a holographic beamforming antenna.

13. The method of claim 9, wherein the analysis of a sensing matrix $\bar{\bar{H}}$, comprises:
   generating a sensing matrix $\bar{\bar{H}}$ of beamform transmission values in which each row corresponds to one of the antenna states and each column corresponds to one of the angle pairs in the region of interest;
   generating a detection column vector $\bar{g}$ of measured signal strengths of signals received from the telecommunication device in each antenna state;
   calculating a pseudo-inverse matrix $\bar{\bar{H}}^{-1}$ of the sensing matrix $\bar{\bar{H}}$;
   estimating a scene row vector $\bar{\sigma}$ as the product of the pseudo-inverse matrix $\bar{\bar{H}}^{-1}$ and the detection column vector $\bar{g}$, wherein each element of the scene row vector $\bar{\sigma}$ corresponds to an angle pair within the region of interest; and
   identifying the location of the telecommunication device as being located at the angle pair corresponding to the element having the highest value in the scene row vector $\bar{\sigma}$.

14. The method of claim 13, wherein each antenna state is a holographic state of a holographic beamforming antenna.

15. The method of claim 13, wherein calculating the pseudo-inverse of the sensing matrix $\overline{\overline{H}}^{-1}$ comprises:
implementing a singular value decomposition factorization of the sensing matrix $\overline{\overline{H}}$ to determine the singular values of the sensing matrix $\overline{\overline{H}}$;
truncating the singular values that are less than a tolerance percentage of a maximum magnitude of a singular value of the sensing matrix $\overline{\overline{H}}$; and
calculating the pseudo-inverse matrix $\overline{\overline{H}}^{-1}$ using the truncated singular values.

16. The method of claim 15, wherein the tolerance percentage comprises one percent, such that the singular values that are less than one percent of the singular value with the maximum magnitude of the sensing matrix $\overline{\overline{H}}$ are truncated.

17. The method of claim 13, wherein the beamform transmission values of the sensing matrix $\overline{\overline{H}}$ comprise measured transmission values at each angle pair in the region of interest for each antenna state.

18. The method of claim 13, wherein the beamform transmission values of the sensing matrix $\overline{\overline{H}}$ comprise calculated transmission values at each angle pair in the region of interest for each antenna state.

19. The method of claim 13, wherein the analysis of the sensing matrix $\overline{\overline{H}}$ further comprises:
transmitting the angle pair location of the telecommunication device to an antenna controller of an external device.

20. The method of claim 13, wherein the analysis of the sensing matrix $\overline{\overline{H}}$ further comprises:
adjusting a steering angle of a beamform of an antenna of a second telecommunication device based on the angle pair location of the telecommunication device.

21. A non-transitory computer-readable medium with instructions stored thereon that, when executed by a processor, operate to:
generate a sensing matrix $\overline{\overline{H}}$ of beamform transmission values in which each row represents one of a plurality of antenna states of an electrically adjustable beamforming antenna and each column represents one azimuth and elevation angle pair within a region, wherein each antenna state of the adjustable beamforming antenna corresponds to at least two orthogonal beamforms steered to different angle pairs within the region;
generate a detection column vector $\overline{g}$ of measured signal strengths of signals received from a telecommunication device in each antenna state of the adjustable beamforming antenna;
compute a pseudo-inverse matrix $\overline{\overline{H}}^{-1}$ of the sensing matrix $\overline{\overline{H}}$;
estimate a scene row vector $\overline{\sigma}$ as a product of the pseudo-inverse matrix $\overline{\overline{H}}^{-1}$ and the detection column vector $\overline{g}$, wherein each element of the scene row vector $\overline{\sigma}$ corresponds to an angle pair within the region; and
report a location of the telecommunication device as the angle pair corresponding to the element having the highest value in the scene row vector $\overline{\sigma}$.

22. The non-transitory computer-readable medium of claim 21, wherein instructions cause the processor to calculate the pseudo-inverse matrix $\overline{\overline{H}}^{-1}$ by:
implementing a singular value decomposition factorization of the sensing matrix $\overline{\overline{H}}$ to determine singular values of the sensing matrix $\overline{\overline{H}}$;
truncating the singular values that are less than a tolerance percentage of a maximum magnitude of a singular value of the sensing matrix $\overline{\overline{H}}$; and
calculating the pseudo-inverse matrix $\overline{\overline{H}}^{-1}$ using the truncated singular values.

23. The non-transitory computer-readable medium of claim 22, wherein the tolerance percentage comprises one percent, such that the singular values that are less than one percent of the singular value of the sensing matrix $\overline{\overline{H}}$ are truncated.

24. The non-transitory computer-readable medium of claim 21, wherein the beamform transmission values of the sensing matrix $\overline{\overline{H}}$ comprise measured transmission values at each angle pair in the region for each antenna state.

25. The non-transitory computer-readable medium of claim 21, wherein the telecommunication device comprises a gNodeB (gNB) of a 5G network.

26. The non-transitory computer-readable medium of claim 21, wherein the number of angle pairs in the region corresponds to a beamwidth of the beamforms generated by the adjustable beamforming antenna.

* * * * *